(12) United States Patent
Ishizuka et al.

(10) Patent No.: US 9,360,593 B2
(45) Date of Patent: Jun. 7, 2016

(54) POLYCARBONATE RESIN, PRODUCTION METHOD THEREFOR, AND OPTICAL MOLDED BODY

(71) Applicant: MITSUBISHI GAS CHEMICAL COMPANY, INC., Tokyo (JP)

(72) Inventors: Hirohito Ishizuka, Ibaraki (JP); Yoshio Nishimura, Tokyo (JP); Noriyuki Kato, Tokyo (JP); Takashi Ishii, Kanagawa (JP); Kouji Hirose, Chiba (JP); Kentarou Ishihara, Tokyo (JP); Munenori Shiratake, Chiba (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/439,440

(22) PCT Filed: Nov. 1, 2013

(86) PCT No.: PCT/JP2013/079762
§ 371 (c)(1),
(2) Date: Apr. 29, 2015

(87) PCT Pub. No.: WO2014/073496
PCT Pub. Date: May 15, 2014

(65) Prior Publication Data
US 2015/0285954 A1  Oct. 8, 2015

(30) Foreign Application Priority Data

Nov. 7, 2012  (JP) ................................. 2012-245124
May 24, 2013  (JP) ................................. 2013-109936
May 30, 2013  (JP) ................................. 2013-113966

(51) Int. Cl.
*C08C 1/14* (2006.01)
*G02B 1/04* (2006.01)
*C08G 64/06* (2006.01)
*C08J 5/18* (2006.01)
*C08G 64/30* (2006.01)
*C08G 63/90* (2006.01)

(52) U.S. Cl.
CPC ................ *G02B 1/041* (2013.01); *C08G 64/06* (2013.01); *C08G 64/307* (2013.01); *C08J 5/18* (2013.01); *G02B 1/04* (2013.01); *C08J 2369/00* (2013.01)

(58) Field of Classification Search
CPC ............ G02B 1/041; C08G 64/06; C08J 5/18
USPC ........................................ 528/196, 198, 201
See application file for complete search history.

(56) References Cited

U.S. PATENT DOCUMENTS

2010/0048855 A1   2/2010   Kato et al.

FOREIGN PATENT DOCUMENTS

| JP | H6-25398 | 2/1994 |
|---|---|---|
| JP | H10-007782 | 1/1998 |
| JP | H11-269259 | 10/1999 |
| JP | 2000-302857 | 10/2000 |
| JP | 2000-302858 | 10/2000 |
| JP | 2001-72872 | 3/2001 |
| JP | 2002-332345 | 11/2002 |
| JP | 2005292184 | * 3/2004 |
| JP | 2005-263778 | 9/2005 |
| JP | 2005-292184 | 10/2005 |
| JP | 2008111047 | * 10/2006 |
| JP | 2006-335974 | 12/2006 |
| JP | 2008-111047 | 5/2008 |
| JP | 2010-132782 | 6/2010 |
| JP | 2011-246583 | 12/2011 |
| JP | 2011-256119 | 12/2011 |
| WO | 2007/142149 | 12/2007 |

OTHER PUBLICATIONS

Search report from International Patent Appl. No. PCT/JP2013/079762, mail date is Feb. 4, 2014.

* cited by examiner

*Primary Examiner* — Terressa Boykin
(74) *Attorney, Agent, or Firm* — Greenblum & Bernstein, P.L.C.

(57) ABSTRACT

The polycarbonate resin of the present invention has a structural unit represented by general formula (A):

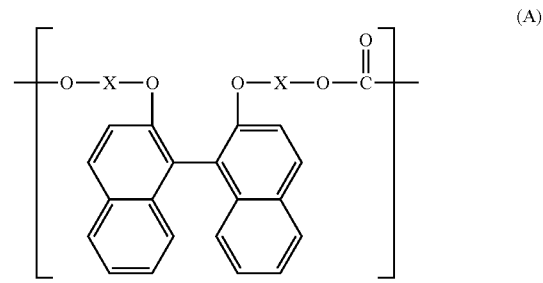

(in formula (A), X is an alkylene group having 1 to 4 carbon atoms).

24 Claims, No Drawings

POLYCARBONATE RESIN, PRODUCTION METHOD THEREFOR, AND OPTICAL MOLDED BODY

TECHNICAL FIELD

The present invention relates to a polycarbonate resin and a preparation method thereof. The present invention also relates to an optical molded article comprising such a polycarbonate resin.

BACKGROUND ART

Background Art 1

As a material for optical lenses which are used in optical systems for various types of cameras (e.g., a camera, a film-integrated camera, a video camera), optical glass or optical resin is used. Optical glass is excellent in heat resistance, transparency, dimensional stability, chemical resistance and so on, but it involves problems of high material cost, poor molding processability and low productivity.

On the other hand, optical lenses made of optical resin are advantageous in that they can be produced in large numbers by injection molding. By way of example, polycarbonate resins and the like are used in camera lenses. In recent years, however, there has been a demand for the development of resins with a higher refractive index, in terms of reduction in the size and weight of final products. In general, when using an optical material with a higher refractive index, a lens element of the same refractive index can be achieved with a surface having a smaller curvature, so that the amount of aberration generated on this surface can be reduced. As a result, it is possible to reduce the number of lenses, to reduce the eccentric sensitivity of lenses and/or to reduce the lens thickness to thereby achieve light weight.

Moreover, for use as optical lenses, optical resins are required to have heat resistance, transparency, low water absorption, chemical resistance, light resistance, low degree of birefringence, moist heat resistance and so on, in addition to the refractive index and Abbe's number. For this reason, optical resins have a drawback in that their use is limited by the balance of their physical properties. Particularly in recent years, there has been a demand for camera lenses with higher imaging performance and a lower degree of birefringence, in response to an improvement in resolution due to the increased number of pixels. In addition, to give a clear image, it is necessary to maintain high transmittance at all wavelengths within the visible range.

Thus, efforts have been made to develop a resin for use in optical lenses, which has a high refractive index and a low degree of birefringence and is excellent in the balance of physical properties. For example, there has been proposed a polyester composed of a fluorene-containing dihydroxy compound and naphthalene dicarboxylic acid (Patent Document 1). However, although this polyester has a high refractive index, there is a problem of large birefringence.

Likewise, there has been proposed a polycarbonate copolymer derived from (1,1'-binaphthalene)-2,2'-diol having a naphthalene structure (Patent Documents 2 and 3). This resin is shown to have a low degree of birefringence. However, (1,1'-binaphthalene)-2,2'-diol is poorly reactive and its content is limited to at most 40 mol % of the copolymer composition, thus not leading to the preparation of a homopolymer having good physical property values.

In addition, there has been proposed a polycarbonate copolymer having a 1,1'-binaphthalene structure (Patent Documents 4 and 5). However, the copolymer shown in Patent Document 4 contains a monomer having a 1,1'-binaphthalene structure at most in an amount up to 40 mol % of the copolymer composition, and it is therefore inferred that the refractive index of the copolymer compares very unfavorably with that of a homopolymer. Moreover, no actual data are presented for the refractive index and birefringence of the copolymer. Patent Document 5 also fails to present any actual data for the refractive index of the polymer.

Moreover, there has also been proposed a 4,4'-dialkoxy-2,2'-binaphthalene-1,1'-di(meth)acrylate monomer which has a binaphthalene structure and shows a high refractive index (Patent Document 6). However, Patent Document 6 mentions only the monomer and does not discuss the physical properties and others of resins prepared from this monomer. In addition, this monomer has two or more polymerizable groups in its molecule and therefore cannot form a thermoplastic resin when polymerized.

Background Art 2

In the optical design of optical units, it is known that a plurality of lenses having mutually different Abbe's numbers are used in combination to thereby correct chromatic aberration. For example, a lens made of a cycloaliphatic polyolefin resin having an Abbe's number ν of 45 to 60 and a lens made of a polycarbonate. (nD=1.586, ν=30) resin composed of bisphenol A having a low Abbe's number are combined to correct chromatic aberration.

As lens materials, optical glass and optical transparent resins are used widely. Optical transparent resins are advantageous in that aspherical lenses can be produced by injection molding and also can be produced in large numbers. Injection molding is a technique in which a resin is softened by heating, injected into a mold by applying injection pressure and filled into the mold for molding, and the molded article is taken out after cooling the resin.

If a higher temperature is used for softening a resin, the flow properties of the resin tend to be improved, but the resin is more likely to be decomposed and/or colored. Thus, there are restrictions on the temperature used for softening.

Most of currently used molding machines are designed such that the mold temperature is maintained constant to thereby ensure the production of products with high surface accuracy. Among these machines, those equipped with a mold temperature controller where pressurized water is used as a heating medium have an upper limit of around 150° C. for the mold temperature. Thus, when attempting to produce products with high surface accuracy in such machines, a restriction may arise in that resins available for use have an upper limit of around 160° C. for their glass transition point temperature.

As transparent resins for use in optical lenses, polycarbonate resins composed of bisphenol A are used widely. This is because polycarbonate resins have a high refractive index and a low Abbe's number (nD=1.586, ν=30), as described above, and also have excellent heat resistance and mechanical properties.

Although polycarbonate resins composed of bisphenol A are widely used for optical lenses, they are required to further improve their refractive index in response to the growing use of optical lenses. Moreover, polycarbonate resins composed of bisphenol A have a drawback of large birefringence and therefore have restrictions on their use. For this reason, various efforts have been made to develop a resin for use in optical lenses, which has not only a high refractive index but also a low degree of birefringence.

A known example is a polycarbonate resin having the repeating unit (B2) shown below, which is derived from 9,9-bis(4-hydroxy-3-methylphenyl)fluorene (Patent Document 7). In the Example section of Patent Document 7, it is shown that this resin achieved a refractive index of 1.646 to 1.653. However, although the resulting lenses were found to have a higher refractive index, it is shown that their glass transition point exceeds 160° C.

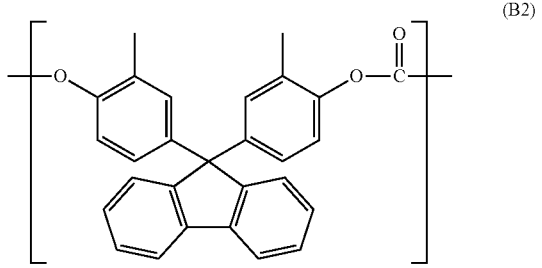

(B2)

Another known example is a polycarbonate resin having the repeating unit (B1) shown below, which is derived from 9,9-bis(4-hydroxy-3-phenylphenyl)fluorene (Patent Document 8). In the Example section of Patent Document 8, it is shown that this resin achieved a refractive index of 1.649 and a glass transition point of 160° C. or less. However, there is proposed no practical composition achieving a refractive index of 1.650 or greater.

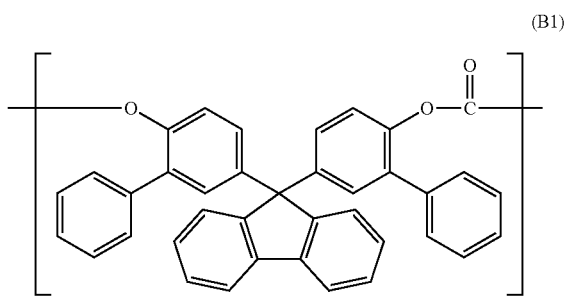

(B1)

Background Art 3

Furthermore, Patent Document 9 discloses that a copolymer composed of a polycarbonate structural unit of bisphenol A type and a structural unit represented by the following formula (E) has an improved refractive index. In the Example section of Patent Document 9, it is shown that this copolymer achieved a refractive index of 1.62 to 1.64 and an Abbe's number of 23 to 26. Such an improvement in refractive index is due to the presence of the structural unit represented by formula (E).

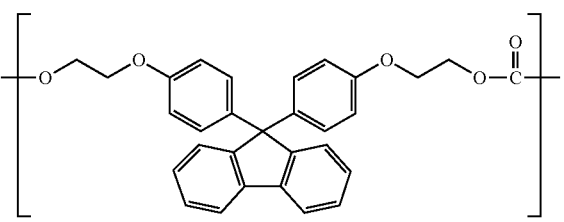

(E)

Moreover, Patent Document 10 discloses a polycarbonate resin comprising a structural unit having a fluorene structure and bisphenol A. In the Example section of this document, it is shown that this resin achieved a refractive index of 1.616 to 1.636. It should be noted that the structural unit disclosed in this document is distinct from formula (E).

The following will discuss birefringence. Polycarbonate resins composed of bisphenol A are widely used for optical lenses, but they have a drawback of large birefringence and therefore have restrictions on their use. For this reason, particularly for recent use in mobile phone cameras and/or digital cameras, there has been a demand for camera lenses with higher imaging performance and a lower degree of birefringence, in response to an improvement in resolution due to the increased number of pixels.

As a means to achieve a low degree of birefringence in resin materials, resins having positive and negative birefringence, respectively, which are of opposite sign to each other, are combined to cancel their mutual birefringence (Patent Document 9), by way of example. Whether the sign of birefringence is positive or negative is determined by the difference between polarizability in the polymer main chain direction and polarizability in the polymer side chain direction. For example, polycarbonate resins composed of bisphenol A whose polarizability in the polymer main chain direction is greater than their polarizability in the polymer side chain direction have positive birefringence, while polycarbonate resins composed of bisphenol having a fluorene structure whose polarizability in the polymer side chain direction is greater than their polarizability in the polymer main chain direction have negative birefringence. For this reason, the combined ratio of these materials having birefringence of opposite sign to each other is very important.

It should be noted that polymers having a 1,1'-binaphthalene structure can be found in Patent Documents 2 to 4 and 11. However, Patent Documents 2 and 3 do not disclose any resin having a structural unit represented by the following formula (A). Although Patent Documents 4 and 11 disclose polymers comprising a structural unit represented by the following formula (A), they are not polycarbonate resin copolymers.

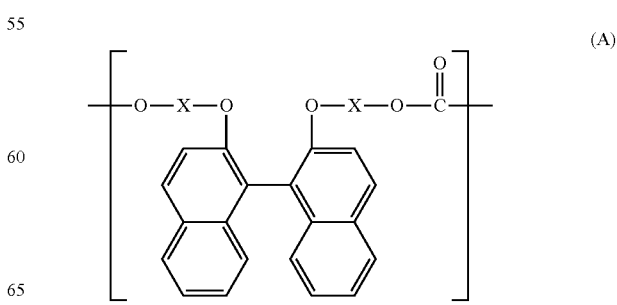

(A)

(in formula (A), X is an alkylene group having 1 to 4 carbon atoms).

As described above, there have not yet been provided a polycarbonate resin copolymer, which has a high refractive index, flow properties suitable for molding and low degree of birefringence, and is less likely to cause optical distortion, as well as optical molded articles thereof.

PRIOR ART DOCUMENTS

Patent Documents

Patent Document 1: Jpn. Pat. Appln. KOKAI Publication No. 2006-335974

Patent Document 2: Jpn. Pat. Appln. KOKAI Publication No. 2000-302857

Patent Document 3: Jpn. Pat. Appln. KOKAI Publication No. 2000-302858

Patent Document 4: Jpn. Pat. Appln. KOKAI Publication No. 2001-72872

Patent Document 5: Jpn. Pat. Appln. KOKAI Publication No. 2005-263778

Patent Document 6: Jpn. Pat. Appln. KOKAI Publication No. 2011-256119

Patent Document 7: Jpn. Pat. Appln. KOKAI Publication No. 2010-132782

Patent Document 8: Jpn. Pat. Appln. KOKAI Publication No. 2011-246583

Patent Document 9: WO2007/142149

Patent Document 10: Jpn. Pat. Appln. KOKAI Publication No. H06-25398

Patent Document 11: Jpn. Pat. Appln. KOKAI Publication No. 2002-332345

SUMMARY

Technical Problem

The problem to be solved by the present invention is to provide a polycarbonate resin having physical properties such as a high refractive index, a low Abbe's number, a high degree of transparency, a glass transition temperature suitable for injection molding, a low degree of birefringence, etc. Moreover, with the use of this resin, the present invention also aims to provide superior optical lenses substantially free from optical distortion.

Solution to Problem

As a result of extensive and intensive efforts made to solve the above problem, the inventors of the present invention have found that the above problem can be solved by the polycarbonate resin and optical molded articles shown below. This finding led to the completion of the present invention.

The present invention is as follows, by way of example.

[1] A polycarbonate resin having a structural unit represented by general formula (A):

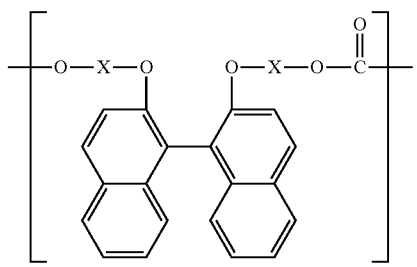

(in formula (A), X is an alkylene group having 1 to 4 carbon atoms).

[2] The polycarbonate resin according to [1], consisting only of the structural unit represented by general formula (A).

[3] A method for preparing the polycarbonate resin according to [1] or [2], wherein a compound represented by general formula (I) is used as a starting material:

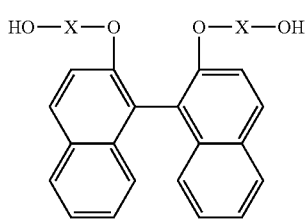

(in formula (I), X is an alkylene group having 1 to 4 carbon atoms).

[4] The method for preparing the polycarbonate resin according to [3], comprising:
reacting the compound represented by general formula (I) and a carbonic acid diester, and
distilling off monohydroxy compounds.

[5] The method for preparing the polycarbonate resin according to [4], wherein the reaction of the compound represented by general formula (I) with the carbonic acid diester is accomplished by melting the compound represented by general formula (I) and the carbonic acid diester, and then reacting them for at least 30 minutes in a state where by-product monohydroxy compounds are kept.

[6] The polycarbonate resin according to [1], further containing a structural unit represented by general formula (B):

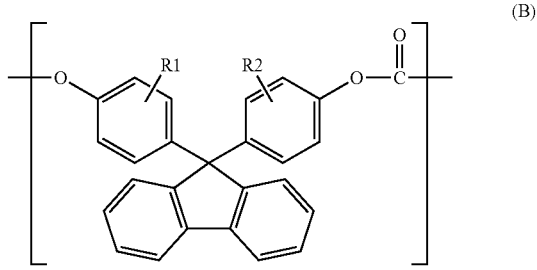

(in formula (B), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[7] The polycarbonate resin according to [6], wherein the molar ratio (A/B) between the structural unit (A) and the structural unit (B) is in the range of 20/80 to 99/1.

[8] The polycarbonate resin according to [6] or [7], wherein the structural unit (A) is a structural unit (A1) represented by the following formula:

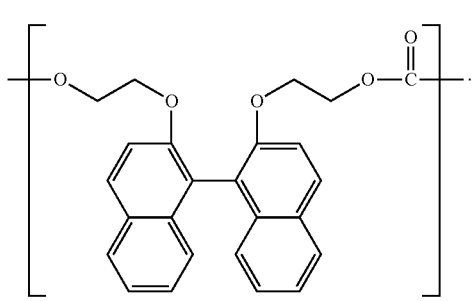

[9] The polycarbonate resin according to any one of [6] to [8], wherein the structural unit (B) is a structural unit (B1) represented by the following formula:

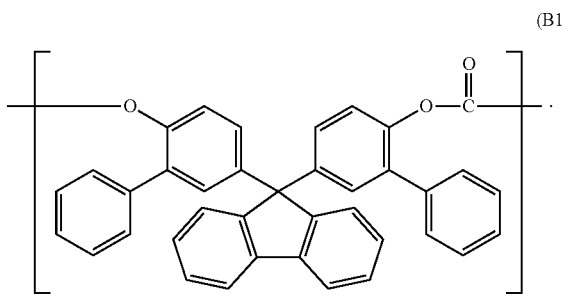

[10] The polycarbonate resin according to any one of [6] to [8], wherein the structural unit (B) is a structural unit (B2) represented by the following formula:

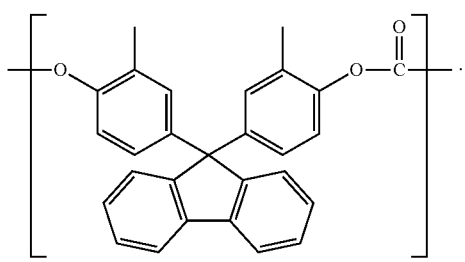

[11] A method for preparing the polycarbonate resin according to any one of [6] to [10], wherein a compound represented by general formula (C) is used as a starting material:

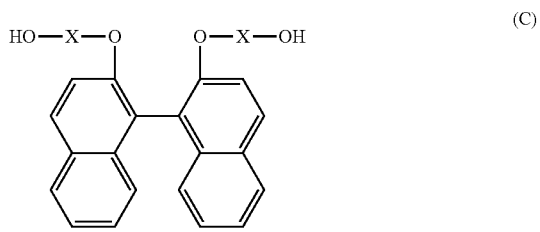

(in formula (C), X is an alkylene group having 1 to 4 carbon atoms).

[12] The method for preparing the polycarbonate resin according to [11], comprising:
reacting the compound represented by general formula (C), a compound represented by general formula (D) and a carbonic acid diester, and
distilling off monohydroxy compounds:

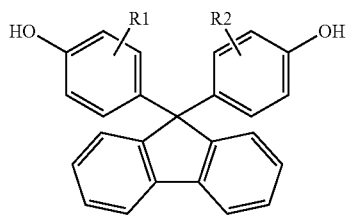

(in formula (D), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[13] The polycarbonate resin according to [1], further containing a structural unit represented by general formula (B'):

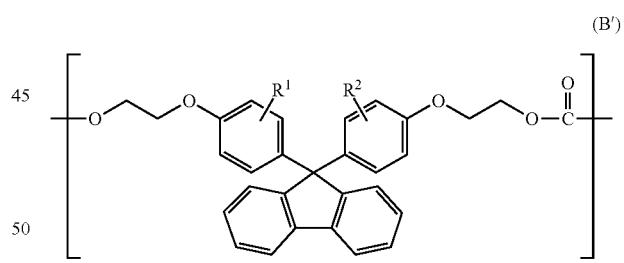

(in formula (B'), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[14] The polycarbonate resin according to [13], wherein the structural unit represented by general formula (A) constitutes 1 to 99 mol % of all structural units.

[15] A polycarbonate resin, consisting only of the structural unit represented by general formula (B').

[16] The polycarbonate resin according to any one of [13] to [15], wherein the resin has a refractive index nD of 1.640 to 1.680 and Abbe's number ν of 24 or less.

[17] The polycarbonate resin according to any one of [13] to [16], wherein the resin has an orientation birefringence Δn of $1.0\times10^{-3}$ or less.

[18] The polycarbonate resin according to any one of [13] to [17], wherein the resin has 5% weight loss temperature of 350° C. or higher measured at a rate of temperature rise of 10° C./min.

[19] A method for preparing the polycarbonate resin according to any one of [13] to [18], wherein a compound represented by general formula (C) is used as a starting material:

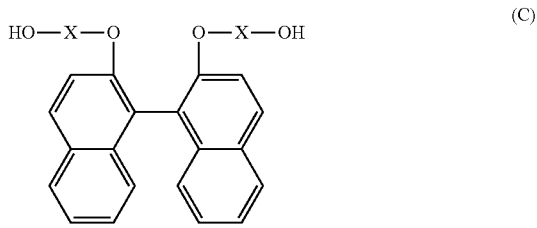

(in formula (C), X is an alkylene group having 1 to 4 carbon atoms).

[20] The method for preparing the polycarbonate resin according to [19], comprising:
reacting the compound represented by general formula (C), a compound represented by general formula (D') and a carbonic acid diester, and
distilling off monohydroxy compounds:

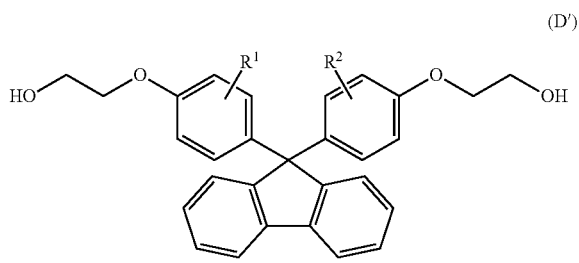

(in formula (D'), $R^1$ and $R^2$ are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[21] The method for preparing the polycarbonate resin according to [20], wherein the reaction of the compound represented by general formula (C), the compound represented by general formula (D') and the carbonic acid diester is accomplished by melting the compound represented by general formula (C), the compound represented by general formula (D') and the carbonic acid diester, and then reacting them for at least 30 minutes in a state where by-product monohydroxy compounds are kept without being distilled off.

[22] An optical molded article, comprising the polycarbonate resin according to any one of [1], [2], [6] to [10] and [13] to [18].

[23] An optical lens, comprising the polycarbonate resin according to any one of [1], [2], [6] to [10] and [13] to [18].

[24] An optical film, comprising the polycarbonate resin according to any one of [1], [2], [6] to [10] and [13] to [18].

Advantageous Effects of Invention

The polycarbonate resin of the present invention shows physical properties such as a high refractive index, a low Abbe's number, a high degree of transparency, a glass transition temperature suitable for injection molding, a low degree of birefringence, etc. Moreover, the resin of the present invention can be used to obtain superior optical lenses substantially free from optical distortion.

DESCRIPTION OF EMBODIMENTS

Illustrative embodiments of the present invention will be described in more detail below.

First Embodiment

The first embodiment includes the following inventions, by way of example.

[1] A polycarbonate resin having a structural unit represented by general formula (A):

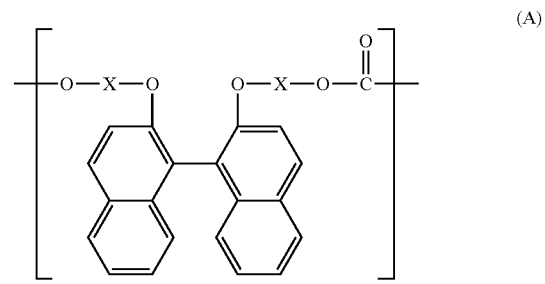

(in formula (A), X is an alkylene group having 1 to 4 carbon atoms).

[2] The polycarbonate resin according to [1], consisting only of the structural unit represented by general formula (A).

[3] The polycarbonate resin according to [1] or [2], wherein the resin has a weight average molecular weight Mw of 20000 to 200000.

[4] An optical molded article, comprising the polycarbonate resin according to any one of [1] to [3].

[5] An optical lens, comprising the polycarbonate resin according to any one of [1] to [3].

[6] An optical film, comprising the polycarbonate resin according to any one of [1] to [3].

[7] A method for preparing the polycarbonate resin according to any one of [1] to [3], wherein a compound represented by general formula (I) is used as a starting material:

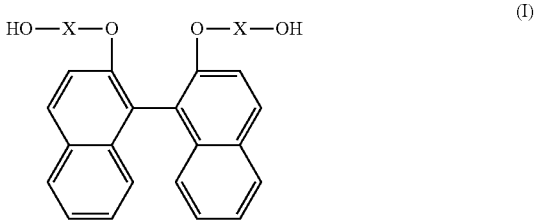

(in formula (I), X is an alkylene group having 1 to 4 carbon atoms).

[8] The method for preparing the polycarbonate resin according to [7], comprising:

reacting the compound represented by general formula (I) and a carbonic acid diester, and distilling off monohydroxy compounds.

[9] The method for preparing the polycarbonate resin according to [8], wherein the reaction of the compound represented by general formula (I) with the carbonic acid diester is accomplished by melting the compound represented by general formula (I) and the carbonic acid diester, and then reacting them for at least 30 minutes in a state where by-product monohydroxy compounds are kept.

The above inventions will be described in more detail below.

(1) Polycarbonate Resin

The polycarbonate resin of the first embodiment is a polycarbonate resin having a structural unit represented by formula (A) (hereinafter referred to as "structural unit (A)"). This polycarbonate resin is a compound prepared when a compound represented by general formula (I) is used as a dihydroxy component and reacted with a carbonate precursor (e.g., a carbonic acid diester), as described later.

In principle, the polycarbonate resin of the first embodiment is a polycarbonate resin having no ester linkage in the main chain, and hence excludes polyester carbonates.

For use as a dihydroxy component, the compound of general formula (I) may further be combined with an aromatic dihydroxy compound and/or an aliphatic dihydroxy compound.

Examples of such an aromatic dihydroxy compound include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, 9,9-bis(4-(2-hydroxyethoxyl)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene and so on.

Above all, the polycarbonate resin of the first embodiment is preferably a polycarbonate resin consisting only of the structural unit represented by formula (A).

The polycarbonate resin of the first embodiment preferably has a weight average molecular weight (Mw) of 20000 to 200000 when calculated as polystyrene.

More preferably, it has a weight average molecular weight (Mw) of 25000 to 120000 when calculated as polystyrene.

If Mw is less than 20000, it is not preferred because the resulting molded articles will become brittle. If Mw is greater than 200000, it is not preferred because the prepared resin will be difficult to collect due to increased melt viscosity and further will be difficult to mold by injection in a molten state due to reduced flow properties.

The polycarbonate resin of the first embodiment has a refractive index (nD) of preferably 1.635 to 1.695, more preferably 1.640 to 1.690, and even more preferably 1.645 to 1.685, when measured at 23° C. and at a wavelength of 589 nm. The polycarbonate resin of the first embodiment has a high refractive index (nD) and is therefore suitable for use as a material for optical lenses. The refractive index can be measured for a film of 0.1 mm thickness using an Abbe refractometer in accordance with the method of JIS-K-7142.

The polycarbonate resin of the first embodiment has an Abbe's number (ν) of preferably 24 or less, more preferably 22 or less, and even more preferably 20 or less. The Abbe's number can be calculated from the refractive indexes measured at 23° C. and at wavelengths of 486 nm, 589 nm and 656 nm, according to the following equation.

$$\nu=(nD-1)/(nF-nC)$$

nD: refractive index at a wavelength of 589 nm
nC: refractive index at a wavelength of 656 nm
nF: refractive index at a wavelength of 486 nm The polycarbonate resin of the first embodiment may be blended with other resins and provided for the production of molded articles. Examples of other resins include polyamides, polyacetals, polycarbonates, modified polyphenylene ethers, polyethylene terephthalates, polybutylene terephthalates and so on.

The polycarbonate resin of the first embodiment may further be supplemented with an antioxidant, a mold release agent, a UV absorber, a flow improver, a crystal nucleating agent, a reinforcing agent, a dye, an antistatic agent or an antibacterial agent, etc.

Molding techniques used for this purpose include, but are not limited to, injection molding, as well as compression molding, casting, rolling, extrusion molding, stretching and so on.

When the polycarbonate resin of the first embodiment is used for injection molding, its preferred glass transition temperature (Tg) is 90° C. to 170° C., more preferably 95° C. to 165° C., and even more preferably 100° C. to 160° C. If Tg is lower than 90° C., it is not preferred because the temperature range available for use becomes narrow. Likewise, if Tg exceeds 170° C., it is not preferred because the melt temperature of the resin becomes higher, so that decomposition and/or coloration is more likely to occur in the resin. If the resin has too high a glass transition temperature, the difference between the mold temperature and the resin's glass transition temperature becomes larger in a commonly used mold temperature controller. For this reason, in applications where precise surface accuracy is required for the resulting products, resins having too high a glass transition temperature are difficult to use and therefore are not preferred.

In the polycarbonate resin of the first embodiment, the 5% weight loss temperature (Td) measured at a rate of temperature rise of 10° C./min is preferably 350° C. or higher, which serves as an indicator for heat stability required to withstand heating during injection molding. If the 5% weight loss temperature is lower than 350° C., it is not preferred because good molded articles are difficult to obtain due to severe thermal decomposition during molding.

In the polycarbonate resin of the first embodiment, the orientation birefringence (Δn) serving as a scale for the amount of birefringence is preferably $1.0 \times 10^{-3}$ or less, and more preferably $0.4 \times 10^{-3}$ or less.

Δn can be determined as follows: a cast film of 0.1 mm thickness is cut out into a square of 5.0 cm per side, and the film is then clamped at the both ends with chucks (distance between the chucks: 3.0 cm), stretched 1.5-fold at a temperature of the polycarbonate resin's Tg+5° C. and measured for phase difference (Re) at 589 nm using an ellipsometer M-220 (JASCO Corporation, Japan), followed by calculation according to the following equation.

$$\Delta n = Re/d$$

Δn: orientation birefringence
Re: phase difference
d: thickness

Optical molded articles obtained using the polycarbonate resin of the first embodiment have a total light transmittance of 85% or more, which compares favorably with that of bisphenol A type polycarbonate resins, etc.

(2) Method for Preparing Polycarbonate Resin

The polycarbonate resin of the first embodiment can be prepared using a dihydroxy compound represented by the above general formula (I) as a starting material. More specifically, a compound represented by general formula (I) and a carbonate precursor (e.g., a carbonic acid diester) may be reacted in the presence of a basic compound catalyst or a transesterification catalyst or a mixture of both catalysts or in the absence of any catalyst by melt polycondensation techniques to prepare the desired polycarbonate resin.

Examples of such a dihydroxy compound represented by formula (I) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, 2,2'-bis(4-hydroxybutoxy)-1,1'-binaphthalene and so on. Among them, preferred is 2,2'-bis(2-hydroxyethoxy)-1,1'-binaphthalene. These compounds may be used either alone or in combination.

Examples of a carbonic acid diester for use in the first embodiment include diphenyl carbonate, ditolyl carbonate, bis(chlorophenyl) carbonate, m-cresyl carbonate, dimethyl carbonate, diethyl carbonate, dibutyl carbonate, dicyclohexyl carbonate and so on. Among them, particularly preferred is diphenyl carbonate. Diphenyl carbonate is preferably used at a ratio of 0.97 to 1.20 moles, more preferably at a ratio of 0.98 to 1.10 moles, relative to 1 mole of total dihydroxy compound(s).

Among transesterification catalysts, basic compound catalysts particularly include alkali metal compounds, alkaline earth metal compounds, and nitrogen-containing compounds, etc.

Examples of alkali metal compounds for use in the present invention include organic acid salts, inorganic salts, oxides, hydroxides, hydrides or alkoxides of alkali metals. Specific examples available for use include sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, as well as a disodium salt, a dipotassium salt, a dicesium salt or a dilithium salt of bisphenol A, a sodium salt, a potassium salt, a cesium salt or a lithium salt of phenol, etc.

Examples of alkaline earth metal compounds include organic acid salts, inorganic salts, oxides, hydroxides, hydrides or alkoxides of alkaline earth metal compounds. Specific examples available for use include magnesium hydroxide, calcium hydroxide, strontium hydroxide, barium hydroxide, magnesium bicarbonate, calcium bicarbonate, strontium bicarbonate, barium bicarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, etc.

Examples of nitrogen-containing compounds include quaternary ammonium hydroxides and salts thereof, amines and so on. Specific examples available for use include quaternary ammonium hydroxides having alkyl groups, aryl groups and other groups (e.g., tetramethyl ammonium hydroxide, tetraethyl ammonium hydroxide, tetrapropyl ammonium hydroxide, tetrabutyl ammonium hydroxide, trimethyl benzyl ammonium hydroxide); tertiary amines (e.g., triethylamine, dimethylbenzylamine, triphenylamine); secondary amines (e.g., diethylamine, dibutylamine); primary amines (e.g., propylamine, butylamine); imidazoles (e.g., 2-methylimidazole, 2-phenylimidazole, benzoimidazole); as well as bases or basic salts (e.g., ammonia, tetramethyl ammonium borohydride, tetrabutyl ammonium borohydride, tetrabutyl ammonium tetraphenylborate, tetraphenyl ammonium tetraphenylborate), etc.

Transesterification catalysts preferred for use are salts of zinc, tin, zirconium, lead and so on, which may be used either alone or in combination.

Specific examples of transesterification catalysts available for use include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, etc.

These catalysts are used at a ratio of $10^{-9}$ to $10^{-3}$ moles, preferably at a ratio of $10^{-7}$ to $10^{-4}$ moles, relative to 1 mole of total dihydroxy compound(s).

Melt polycondensation techniques are intended to conduct melt polycondensation through transesterification reaction using the above starting materials and catalysts under heating and further under normal or reduced pressure while removing by-products.

For melt polycondensation in this compositional system, it is desired that a compound represented by general formula (I) and a carbonic acid diester are melted in a reaction vessel and then reacted in a state where by-product monohydroxy compounds are kept. To keep the by-product compounds, the reaction system may be closed or may be vacuumed or pressurized for pressure control purposes. The reaction time required for this step is 20 minutes to 240 minutes, preferably 40 minutes to 180 minutes, and particularly preferably 60 minutes to 150 minutes. During this step, if the by-product monohydroxy compounds are distilled off immediately upon their generation, the finally obtained polycarbonate resin is low in the content of high molecular weight components. However, if the by-product monohydroxy compounds are kept in the reaction vessel for a given period of time, the finally obtained polycarbonate resin is high in the content of high molecular weight components.

The melt polycondensation reaction may be conducted either in a continuous manner or in a batch manner. The reaction system for use in this reaction may be a vertical reactor equipped with an anchor-type impeller, a Maxblend impeller, a helical ribbon-type impeller or the like, or may be a horizontal reactor equipped with a paddle impeller, a grid impeller, a spectacle impeller or the like, or may be an extruder-type reactor equipped with a screw. Moreover, it is preferred to use a reaction system composed of these reactors in combination as appropriate, in consideration of the viscosity of the polymerized product.

In a method for preparing the polycarbonate resin for use in the inventions according to the first embodiment, after completion of the polymerization reaction, the catalyst(s) may be removed or deactivated in order to maintain heat stability and hydrolysis stability. Known techniques for catalyst deactivation which involve addition of an acidic substance may preferably be used for this purpose. Specific examples of an acidic substance preferred for use include esters (e.g., butyl benzoate); aromatic sulfonic acids (e.g., p-toluenesulfonic acid); aromatic sulfonic acid esters (e.g., butyl p-toluenesulfonate, hexyl p-toluenesulfonate); phosphoric acid members (e.g., phosphorous acid, phosphoric acid, phosphonic acid); phosphorous acid esters (e.g., triphenyl phosphite, monophenyl phosphite, diphenyl phosphite, diethyl phosphite, di-n-propyl phosphite, di-n-butyl phosphite, di-n-hexyl phosphite, dioctyl phosphite, monooctyl phosphite); phosphoric acid esters (e.g., triphenyl phosphate, diphenyl phosphate, monophenyl phosphate, dibutyl phosphate, dioctyl phosphate, monooctyl phosphate); phosphonic acid members (e.g., diphenylphosphonic acid, dioctylphosphonic acid, dibutylphosphonic acid); phosphonic acid esters (e.g., diethyl phenylphosphonate); phosphines (e.g., triphenylphosphine, bis(diphenylphosphino)ethane); boric acid members (e.g., boric acid, phenylboric acid); aromatic sulfonic acid salts (e.g., dodecylbenzenesulfonic acid tetrabutylphosphonium salt); organic halides (e.g., stearic acid chloride, benzoyl chloride, p-toluenesulfonic acid chloride); alkyl sulfates (e.g., dimethyl sulfate); organic halides (e.g., benzyl chloride), etc. These deactivators are used in 0.01- to 50-fold molar excess, preferably 0.3- to 20-fold molar excess, relative to the amount of the catalyst(s). If the amount used is less than 0.01-fold molar excess relative to the amount of the catalyst(s), it is not preferred because the deactivation effect is not high enough. Likewise, if the amount used is greater than 50-fold molar excess relative to the amount of the catalyst(s), it is not preferred because the heat resistance of the resin is reduced, so that coloration is more likely to occur in the resulting molded articles.

Catalyst deactivation may be followed by a step where low boiling point compounds in the polymer are removed by devolatilization at a pressure of 0.1 to 1 mmHg and at a temperature of 200° C. to 350° C. In this step, a horizontal evaporator equipped with an impeller which is excellent in surface renewal ability (e.g., a paddle impeller, a grid impeller, a spectacle impeller) or a thin film evaporator is preferred for use.

The polycarbonate resin of the first embodiment is desired to be extremely low in the content of contaminants, which is preferably accomplished by filtration of the molten starting materials and/or filtration of the catalyst solution, etc. The mesh size of the filter is preferably 5 µm or less, and more preferably 1 µm or less. Further, the resulting resin is preferably filtered through a polymer filter. The mesh size of the polymer filter is preferably 100 µm or less, and more preferably 30 µm or less. Moreover, the step of collecting resin pellets should be conducted, of course, in a low dust environment, which is preferably of class 6 or below, and more preferably of class 5 or below.

(3) Optical Molded Article

The polycarbonate resin of the first embodiment can be used to produce optical molded articles, which may be molded in any manner, for example, by injection molding, compression molding, extrusion molding, solvent casting, etc. The polycarbonate resin of the first embodiment is excellent in moldability and heat resistance, and therefore can be advantageously used particularly in optical lenses which are required to be formed by injection molding. During molding, the polycarbonate resin of the first embodiment may be used in admixture with additional polycarbonate resins and/or other types of resins such as polyester resins. Moreover, the polycarbonate resin of the first embodiment may be mixed with additives such as an antioxidant, a processing stabilizer, a light stabilizer, a metal deactivator, a flame retardant, a lubricant, an antistatic agent, a surfactant, an antibacterial agent, a mold release agent, a UV absorber, a plasticizer, a compatibilizer and so on.

Examples of an antioxidant include triethylene glycol-bis [3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[3-(3-tert-butyl-4-hydroxy-5-methylphenyl)propionyloxy]ethyl}-2,4,8,10-tetraoxaspiro(5,5)undecane, etc. The content of such an antioxidant in the polycarbonate resin is preferably 0.001 to 0.3 parts by weight, relative to 100 parts by weight of the polycarbonate resin.

Examples of a processing stabilizer include phosphorus-based processing heat stabilizers, sulfur-based processing heat stabilizers and so on. Examples of phosphorus-based processing heat stabilizers include phosphorous acid, phosphoric acid, phosphonous acid, phosphonic acid, and esters thereof, etc. Specific examples include triphenyl phosphite, tris(nonylphenyl)phosphite, tris(2,4-di-tert-butylphenyl) phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-dicumylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite, etc. The content of such a phosphorus-based processing heat stabilizer in the polycarbonate resin is preferably 0.001 to 0.2 parts by weight, relative to 100 parts by weight of the polycarbonate resin.

Examples of sulfur-based processing heat stabilizers include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, distearyl-3,3'-thiodipropionate, etc. The content of such a sulfur-based processing heat stabilizer in the polycarbonate resin is preferably 0.001 to 0.2 parts by weight, relative to 100 parts by weight of the polycarbonate resin.

A mold release agent preferred for the above purpose is composed of esters formed between alcohols and fatty acids, which constitute 90% by weight or more of the agent. Specific examples of esters formed between alcohols and fatty acids include esters formed between monohydric alcohols and fatty acids, as well as partial or full esters formed between polyhydric alcohols and fatty acids. The above esters formed between monohydric alcohols and fatty acids are preferably esters formed between monohydric alcohols having 1 to 20 carbon atoms and saturated fatty acids having 10 to 30 carbon atoms. Likewise, the partial or full esters formed between polyhydric alcohols and fatty acids are preferably partial or full esters formed between polyhydric alcohols having 1 to 25 carbon atoms and saturated fatty acids having 10 to 30 carbon atoms.

More specifically, such esters formed between monohydric alcohols and saturated fatty acids may be exemplified by stearyl stearate, palmityl palmitate, butyl stearate, methyl laurate, isopropyl palmitate and so on. Such partial or full esters formed between polyhydric alcohols and saturated fatty acids may be exemplified by stearic acid monoglyceride, stearic acid monoglyceride, stearic acid diglyceride, stearic acid triglyceride, stearic acid monosorbitate, behenic acid monoglyceride, capric acid monoglyceride, lauric acid monoglyceride, pentaerythritol monostearate, pentaerythritol tetrastearate, pentaerythritol tetrapelargonate, propyleneglycol monostearate, biphenyl biphenate, sorbitan monostearate, 2-ethylhexyl stearate, as well as full or partial esters of dipentaerythritol, such as dipentaerythritol hexastearate. The content of these mold release agents is preferably in the range of 0.005 to 2.0 parts by weight, more preferably in the range of 0.01 to 0.6 parts by weight, and even more preferably in the range of 0.02 to 0.5 parts by weight, relative to 100 parts by weight of the polycarbonate resin.

A UV absorber preferred for the above purpose is at least one selected from the group consisting of a benzotriazole-based UV absorber, a benzophenone-based UV absorber, a triazine-based UV absorber, a cyclic imino ester-based UV absorber and a cyanoacrylate-based UV absorber. Namely, the UV absorbers listed below may be used either alone or in combination.

Examples of a benzotriazole-based UV absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl]benzotriazole, etc.

Examples of a benzophenone-based UV absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxy trihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone, etc.

Examples of a triazine-based UV absorber include 2-(4,6-diphenyl-1,3,5-triazin-2-yl)-5-[(hexyl)oxy]-phenol, 2-(4,6-bis(2,4-dimethylphenyl)-1,3,5-triazin-2-yl)-5-[(octyl)oxy]-phenol, etc.

Examples of a cyclic imino ester-based UV absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one), etc.

Examples of a cyanoacrylate-based UV absorber include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene, etc.

The content of such a UV absorber is preferably 0.01 to 3.0 parts by weight, more preferably 0.02 to 1.0 parts by weight, and even more preferably 0.05 to 0.8 parts by weight, relative to 100 parts by weight of the polycarbonate resin. At a UV absorber content within such a range, weather resistance sufficient for the intended use can be imparted to the polycarbonate resin.

The polycarbonate resin of the first embodiment shows a high refractive index and excellent heat resistance, and also has flow properties suitable for molding. Further, because of being less likely to cause optical distortion due to its low degree of birefringence, it can be advantageously used not only for optical lenses, but also as an electrically conductive transparent substrate for use in liquid crystal displays, organic EL displays, solar photovoltaic cells and so on, and/or as an optical molded article suitable for use as a structural material or functional material for optical components such as optical disks, liquid crystal panels, optical memory cards, sheets, films, optical fibers, connectors, evaporated plastic reflecting mirrors, displays and so on.

The surface of such an optical molded article may optionally be provided with a coating layer such as an antireflection layer or a hard coat layer. Such an antireflection layer may be composed of a single layer or multiple layers, and may be formed from an organic material or an inorganic material, but is preferably formed from an inorganic material. Specific examples include oxides or fluorides such as silicon oxide, aluminum oxide, zirconium oxide, titanium oxide, cerium oxide, magnesium oxide, magnesium fluoride and so on.

(Optical Lens)

Optical lenses produced by using the polycarbonate resin of the first embodiment are very useful because they have a high refractive index and are excellent in heat resistance, and therefore can be used in the fields of telescopes, binoculars, television projectors and others where expensive high refractive index glass lenses have been used conventionally. They are preferably used in the form of aspherical lenses, as needed. In the case of aspherical lenses, a single lens achieves substantially zero spherical aberration, which eliminates the need to remove spherical aberration by combining a plurality of spherical lenses, thereby achieving light weight and production cost savings. Thus, aspherical lenses are particularly useful as camera lenses among optical lenses.

Optical lenses are molded in any manner, for example, by injection molding, compression molding, injection compression molding, etc. According to the inventions of the first embodiment, aspherical lenses with a high refractive index and a low degree of birefringence can be obtained in a simpler manner, which are technically difficult to process in the case of using glass lenses.

To minimize the entry of contaminants into optical lenses, the environment for molding should also be, of course, a low dust environment, which is preferably of class 6 or below, and more preferably of class 5 or below.

(Optical Film)

Optical films produced by using the polycarbonate resin of the first embodiment are excellent in transparency and heat resistance, and are therefore preferred for use in films for liquid crystal substrates, optical memory cards and so on.

To minimize the entry of contaminants into optical films, the environment for molding should also be, of course, a low dust environment, which is preferably of class 6 or below, and more preferably of class 5 or below.

EXAMPLES

The first embodiment will be described by way of the following examples, which are not intended to limit the present invention. It should be noted that the measured values in the following examples were determined by using the methods or systems shown below.

1) Weight average molecular weight (Mw) calculated as polystyrene: Gel permeation chromatography (GPC) was used to prepare a calibration curve from polystyrene standards of known molecular weight (molecular weight distribution=1) by using tetrahydrofuran as a developing solvent. Based on this calibration curve, Mw was calculated from the retention time in GPC.

2) Refractive index (nD): This value was measured for a film of 0.1 mm thickness formed from the polycarbonate resin prepared in each example by using an Abbe refractometer in accordance with the method of JIS-K-7142.

3) Abbe's number (ν): Refractive indexes at 23° C. and at wavelengths of 486 nm, 589 nm and 656 nm were measured for a film of 0.1 mm thickness formed from the polycarbonate resin prepared in each example by using an Abbe refractometer, followed by calculation according to the following equation to determine the Abbe's number.

$$\nu=(nD-1)/(nF-nC)$$

nD: refractive index at a wavelength of 589 nm
nC: refractive index at a wavelength of 656 nm
nF: refractive index at a wavelength of 486 nm 4) Glass transition temperature (Tg): This value was measured by using a differential scanning calorimeter (DSC).

5) Thermal decomposition initiation temperature (Td): A differential thermobalance (TG-DTA) was used to measure a 5% weight loss temperature under an air stream. The rate of temperature rise is set to 10° C./min.

6) Orientation birefringence (Δn): A cast film of 0.1 mm thickness was cut out into a square of 5.0 cm per side, and the film was then clamped at the both ends with chucks (distance between the chucks: 3.0 cm) and stretched 1.5-fold at a temperature of the polycarbonate resin's Tg+5° C. The stretched film was measured for phase difference (Re) at 589 nm using an ellipsometer M-220 (JASCO Corporation, Japan), followed by calculation according to the following equation to determine the orientation birefringence (Δn).

$$\Delta n = Re/d$$

Δn: orientation birefringence
Re: phase difference
d: thickness

7) Total light transmittance: This value was measured for a film of 0.1 mm thickness formed from the polycarbonate resin prepared in each example by using a turbidimeter NDH2000 (Nippon Denshoku Industries Co., Ltd., Japan) in accordance with the method of JIS-K-7361-1.

(1) Preparation of Polycarbonate Resins

Example 1

2,2'-Bis(2-hydroxyethoxy)-1,1'-binaphthalene (hereinafter also abbreviated as "BHEBN") (43.1 g, 0.115 moles), diphenyl carbonate (hereinafter also abbreviated as "DPC") (25.0 g, 0.117 moles) and sodium bicarbonate ($1.1 \times 10^{-4}$ g, $1.3 \times 10^{-6}$ moles) were introduced into a 300 ml four-necked flask equipped with a stirring unit and a distillation unit, and then heated to 180° C. under a nitrogen atmosphere at 760 mmHg. At 10 minutes after initiation of heating, the starting materials were confirmed to be completely dissolved, followed by stirring for 110 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

Comparative Example 1

1,5-Di(2-hydroxyethoxy)naphthalene (hereinafter also abbreviated as "1,5-DHEN") (30.0 g, 0.121 moles), DPC (26.4 g, 0.123 moles) and sodium bicarbonate ($6.1 \times 10^{-5}$ g, $7.2 \times 10^{-7}$ moles) were introduced into a 300 ml four-necked flask equipped with a stirring unit and a distillation unit, and then heated to 180° C. under a nitrogen atmosphere at 760 mmHg. At 10 minutes after initiation of heating, the starting materials were confirmed to be completely dissolved, followed by stirring for 20 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

Comparative Example 2

The same procedures as shown in Comparative Example 1 were repeated to collect the resulting polycarbonate resin, except that 1,5-DHEN in Comparative Example 1 was replaced with 2,3-di(2-hydroxyethoxy)naphthalene (hereinafter also abbreviated as "2,3-DHEN"), and 2,3-DHEN was used in an amount of 31.2 g (0.126 moles), DPC was used in an amount of 27.6 g (0.129 moles) and sodium bicarbonate was used in an amount of $6.3 \times 10^{-5}$ g ($7.5 \times 10^{-7}$ moles).

The resulting polycarbonate resin was found to have a low molecular weight and was not able to be formed into a film.

Comparative Example 3

The same procedures as shown in Comparative Example 1 were repeated to collect the resulting polycarbonate resin, except that 1,5-DHEN in Comparative Example 1 was replaced with 2,6-di(2-hydroxyethoxy)naphthalene (hereinafter also abbreviated as "2,6-DHEN"), and 2,6-DHEN was used in an amount of 31.1 g (0.125 moles), DPC was used in an amount of 27.4 g (0.128 moles) and sodium bicarbonate was used in an amount of $6.3 \times 10^{-5}$ g ($7.5 \times 10^{-7}$ moles).

The resulting polycarbonate resin was not amorphous and also was not able to be measured for its optical properties because of not being soluble in any solvent.

Comparative Example 4

The same procedures as shown in Comparative Example 1 were repeated to collect the resulting polycarbonate resin, except that 1,5-DHEN in Comparative Example 1 was replaced with 2,7-di(2-hydroxyethoxy)naphthalene (hereinafter also abbreviated as "2,7-DHEN"), and 2,7-DHEN was used in an amount of 30.1 g (0.121 moles), DPC was used in an amount of 26.5 g (0.124 moles) and sodium bicarbonate was used in an amount of $6.1 \times 10^{-5}$ g ($7.3 \times 10^{-7}$ moles).

The resulting polycarbonate resin was not amorphous and also was not able to be measured for its optical properties because of not being soluble in any solvent.

Comparative Example 5

As a polycarbonate resin consisting of bisphenol A (hereinafter also abbreviated as "BPA"), a resin commercially available under the trade name "Iupilon H-4000" was used (a product of Mitsubishi Engineering-Plastics Corporation, Japan; Mw=33,000, Tg=148° C.).

(2) Production of Optical Films

The polycarbonate resins obtained in Example 1 and Comparative Examples 1 to 5 were dissolved in methylene chloride to prepare resin solutions each having a solid content of 5.3% by weight. Cast films of 0.1 mm thickness were prepared from these resin solutions, and evaluated for refractive index (nD), Abbe's number (ν) and total light transmittance. Moreover, the resulting cast films were each stretched 1.5-fold at a temperature of Tg+5° C. and evaluated for orientation birefringence (Δn).

It should be noted that the polycarbonate resins other than those of Example 1 and Comparative Examples 1 and 5 were not able to be formed into cast films.

The resins obtained in the example and comparative examples described above were measured for weight average molecular weight (Mw) calculated as polystyrene, glass transition temperature (Tg), thermal decomposition initiation temperature (Td), refractive index (nD), Abbe's number (ν), total light transmittance and orientation birefringence (Δn), and the results obtained are shown in Table 1-1. In addition, the criteria used for evaluation of orientation birefringence (Δn) are shown in Table 1-2.

TABLE 1-1

| | Evaluation results of resin properties | | | | | | |
|---|---|---|---|---|---|---|---|
| | Starting diol component | Mw — | Tg ° C. | Td ° C. | nD — | ν — | Δn ×10⁻³ | Total light transmittance % |
| Example 1 | BHEBN | 32000 | 116 | 359 | 1.668 | 19 | 0.37 | 87 |
| Comparative Example 1 | 1,5-DHEN | 37000 | 93 | 366 | 1.613 | 23 | >10 | 88 |
| Comparative Example 2 | 2,3-DHEN | 13000 | 78 | 332 | — | — | — | — |
| Comparative Example 3 | 2,6-DHEN | — | 87 | 369 | — | — | — | — |
| Comparative Example 4 | 2,7-DHEN | — | 82 | 367 | — | — | — | — |
| Comparative Example 5 | BPA | 33000 | 148 | 450 | 1.586 | 30 | 9.5 | 90 |

TABLE 1-2

| Orientation birefringence Δn (×10⁻³) | Evaluation |
|---|---|
| 0 to 1.0 | Small |
| Greater than 1.0 to 10 | Large |
| Greater than 10 | Very large |

Second Embodiment

The second embodiment includes the following inventions, by way of example.

[1] A polycarbonate resin copolymer containing structural units represented by general formula (A) and general formula (B):

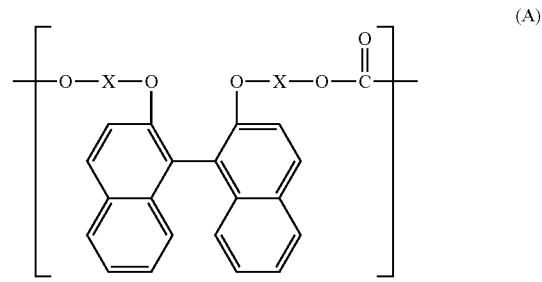

(A)

(in formula (A), X is an alkylene group having 1 to 4 carbon atoms), and

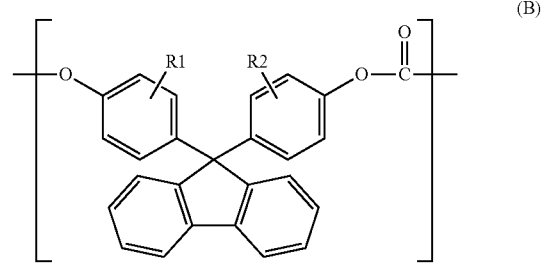

(B)

(in formula (B), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[2] The polycarbonate resin copolymer according to [1], wherein the molar ratio (A/B) between the structural unit (A) and the structural unit (B) is in the range of 20/80 to 99/1.

[3] The polycarbonate resin copolymer according to [1] or [2], wherein the structural unit (A) is a structural unit (A1) represented by the following formula:

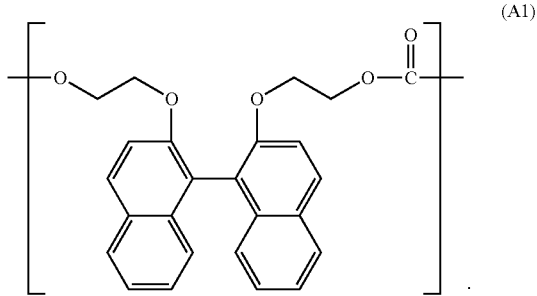

(A1)

[4] The polycarbonate resin copolymer according to any one of [1] to [3], wherein the structural unit (B) is a structural unit (B1) represented by the following formula:

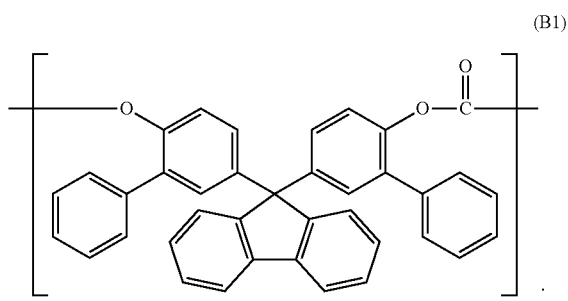

(B1)

[5] The polycarbonate resin copolymer according to any one of [1] to [3], wherein the structural unit (B) is a structural unit (B2) represented by the following formula:

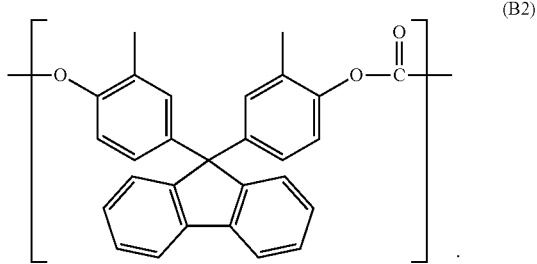

(B2)

[6] The polycarbonate resin copolymer according to any one of [1] to [5], wherein the copolymer has a refractive index nD of in the range of 1.650 to 1.670 and a whose glass transition temperature of 120° C. to 200° C.

[7] An optical molded article, comprising the polycarbonate resin copolymer according to any one of [1] to [6].

[8] An optical lens, comprising the polycarbonate resin copolymer according to any one of [1] to [6].

[9] An optical film, comprising the polycarbonate resin copolymer according to any one of [1] to [6].

[10] A method for preparing the polycarbonate resin copolymer according to any one of [1] to [6], wherein a compound represented by general formula (C) is used as a starting material:

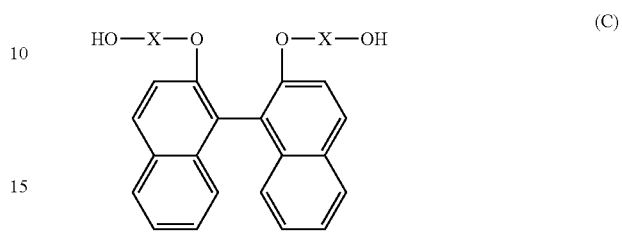

(C)

(in formula (C), X is an alkylene group having 1 to 4 carbon atoms).

[11] The method for preparing the polycarbonate resin copolymer according to [10], comprising:
  reacting the compound represented by general formula (C), a compound represented by general formula (D) and a carbonic acid diester, and
  distilling off monohydroxy compounds:

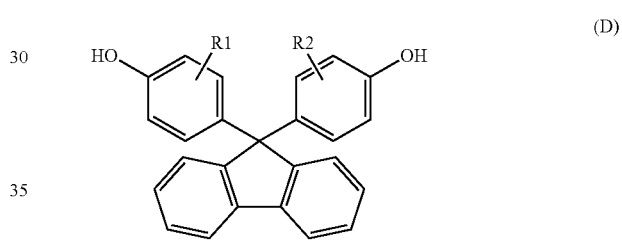

(D)

(in formula (D), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

The above inventions will be described in more detail below.

(1) Polycarbonate Resin Copolymer

The copolymer of the second embodiment is a polycarbonate resin containing a structural unit represented by formula (A) (hereinafter referred to as "structural unit (A)") and a structural unit represented by formula (B) (hereinafter referred to as "structural unit (B)") (which resin is also hereinafter referred to as "the polycarbonate resin copolymer of the second embodiment").

The total ratio of the above structural units (A) and (B) is preferably 50 mol % or more, more preferably 80 mol % or more, particularly preferably 90 mol % or more, and most preferably 100 mol %, relative to all the carbonate structural units constituting the polycarbonate resin copolymer of the second embodiment. The polycarbonate resin copolymer of the second embodiment may comprise any other structural units in addition to the above structural units (A) and (B).

The molar ratio (A/B) between the structural unit (A) and the structural unit (B) is preferably 20/80 to 99/1, more preferably 30/70 to 95/5, and even more preferably 40/60 to 90/10.

If (B) is (B1), the molar ratio (A/B1) between the structural unit (A) and the structural unit (B1) is preferably 20/80 to 99/1, more preferably 45/55 to 95/5, and even more preferably 75/25 to 90/10.

If (B) is (B2), the molar ratio (A/B2) between the structural unit (A) and the structural unit (B2) is preferably 20/80 to 99/1, and more preferably 40/60 to 95/5.

The polycarbonate resin copolymer of the second embodiment may comprise any of random, block and alternating copolymer structures.

The polycarbonate resin copolymer of the second embodiment has a refractive index (nD) of preferably 1.640 to 1.680, when measured at 23° C. and at a wavelength of 589 nm.

If (B) is (B1), the refractive index is desirably 1.666 or greater, more desirably 1.668 or greater, and extremely desirably 1.669 or greater.

If (B) is (B2), the refractive index is desirably 1.650 or greater, and more desirably 1.660 or greater.

The polycarbonate resin copolymer of the second embodiment has a high refractive index (nD) and is therefore suitable for use as a material for optical lenses. The refractive index can be measured for a film of 0.1 mm thickness formed from the polycarbonate resin copolymer of the second embodiment using an Abbe refractometer in accordance with the method of JIS-K-7142.

The polycarbonate resin copolymer of the second embodiment has an Abbe's number (v) of preferably 24 or less.

If (B) is (B1), the Abbe's number is desirably 22 or less, more desirably 20 or less, and extremely desirably 19 or less.

If (B) is (B2), the Abbe's number is desirably 23 or less, and extremely desirably 19 or less.

The Abbe's number can be calculated from the refractive indexes measured at 23° C. and at wavelengths of 486 nm, 589 nm and 656 nm, according to the following equation.

$$v = (nD-1)/(nF-nC)$$

nD: refractive index at a wavelength of 589 nm
nC: refractive index at a wavelength of 656 nm
nF: refractive index at a wavelength of 486 nm When the polycarbonate resin copolymer of the second embodiment is used for injection molding, its preferred glass transition temperature (Tg) is 120° C. to 190° C.

If (B) is (B1), the glass transition temperature is desirably 120° C. to 180° C., more desirably 130° C. to 170° C., and extremely desirably 140° C. to 160° C.

If (B) is (B2), the glass transition temperature is desirably 120° C. to 190° C., more desirably 130° C. to 170° C., and extremely desirably 140° C. to 160° C.

If Tg is lower than 95° C., it is not preferred because the temperature range available for use becomes narrow. Likewise, if Tg exceeds 200° C., it is not preferred because the melt temperature of the resin becomes higher, so that decomposition and/or coloration is more likely to occur in the resin. If the resin has too high a glass transition temperature, the difference between the mold temperature and the resin's glass transition temperature becomes larger in a commonly used mold temperature controller. For this reason, in applications where precise surface accuracy is required for the resulting products, resins having too high a glass transition temperature are difficult to use and therefore are not preferred.

Optical molded articles obtained using the polycarbonate resin copolymer of the second embodiment preferably have a total light transmittance of 85% or more.

The polycarbonate resin copolymer of the second embodiment may further be supplemented with an antioxidant, a mold release agent, a UV absorber, a flow improver, a crystal nucleating agent, a reinforcing agent, a dye, an antistatic agent or an antibacterial agent, etc.

(2) Method for Preparing Polycarbonate Resin Copolymer

The polycarbonate resin copolymer of the second embodiment can be prepared using compound (C) as a starting material. More specifically, compound (C), compound (D) and a carbonate precursor (e.g., a carbonic acid diester) may be reacted in the presence of a basic compound catalyst or a transesterification catalyst or a mixture of both catalysts or in the absence of any catalyst by melt polycondensation techniques to prepare the desired polycarbonate resin copolymer:

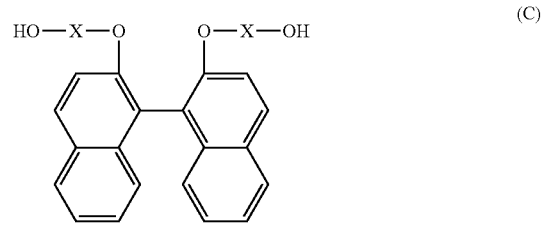

(in formula (C), X is an alkylene group having 1 to 4 carbon atoms), and

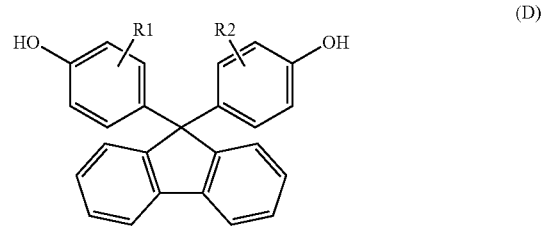

(in formula (D), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

Examples of a dihydroxy compound represented by formula (C) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, 2,2'-bis(4-hydroxybutoxy)-1,1'-binaphthalene and so on. Among them, preferred is 2,2'-bis(2-hydroxyethoxy)-1,1'-binaphthalene. These compounds may be used either alone or in combination.

Examples of a dihydroxy compound represented by formula (D) include units derived from 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, 9,9-bis(4-hydroxy-2-phenylphenyl)fluorene, 9,9-bis(4-hydroxy-3-phenylphenyl)fluorene, 9,9-bis[4-hydroxy-3-(3-methylphenyl)phenyl]fluorene and so on. Among them, preferred are 9,9-bis(4-hydroxy-3-phenylphenyl)fluorene and 9,9-bis(4-hydroxy-3-methylphenyl)fluorene. These compounds may be used either alone or in combination.

Examples of a carbonic acid diester for use in the second embodiment include diphenyl carbonate, ditolyl carbonate, bis(chlorophenyl) carbonate, m-cresyl carbonate, dimethyl carbonate, diethyl carbonate, dibutyl carbonate, dicyclohexyl carbonate and so on. Among them, particularly preferred is diphenyl carbonate. Diphenyl carbonate is preferably used at a ratio of 0.97 to 1.20 moles, more preferably at a ratio of 0.98 to 1.10 moles, relative to 1 mole of total dihydroxy compounds.

Examples of a basic compound catalyst particularly include alkali metal compounds, alkaline earth metal compounds, and nitrogen-containing compounds, etc.

Examples of alkali metal compounds for use in the present invention include organic acid salts, inorganic salts, oxides, hydroxides, hydrides or alkoxides of alkali metals. Specific examples available for use include sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, as well as a disodium salt, a dipotassium salt, a dicesium salt or a dilithium salt of bisphenol A, a sodium salt, a potassium salt, a cesium salt or a lithium salt of phenol, etc.

Examples of alkaline earth metal compounds include organic acid salts, inorganic salts, oxides, hydroxides, hydrides or alkoxides of alkaline earth metal compounds. Specific examples available for use include magnesium hydroxide, calcium hydroxide, strontium hydroxide, barium hydroxide, magnesium bicarbonate, calcium bicarbonate, strontium bicarbonate, barium bicarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, etc.

Examples of nitrogen-containing compounds include quaternary ammonium hydroxides and salts thereof, amines and so on. Specific examples available for use include quaternary ammonium hydroxides having alkyl groups, aryl groups and other groups (e.g., tetramethyl ammonium hydroxide, tetraethyl ammonium hydroxide, tetrapropyl ammonium hydroxide, tetrabutyl ammonium hydroxide, trimethyl benzyl ammonium hydroxide); tertiary amines (e.g., triethylamine, dimethylbenzylamine, triphenylamine); secondary amines (e.g., diethylamine, dibutylamine); primary amines (e.g., propylamine, butylamine); imidazoles (e.g., 2-methylimidazole, 2-phenylimidazole, benzoimidazole); as well as bases or basic salts (e.g., ammonia, tetramethyl ammonium borohydride, tetrabutyl ammonium borohydride, tetrabutyl ammonium tetraphenylborate, tetraphenyl ammonium tetraphenylborate), etc.

Transesterification catalysts preferred for use are salts of zinc, tin, zirconium, lead and so on, which may be used either alone or in combination.

Specific examples of transesterification catalysts available for use include zinc acetate, zinc benzoate, zinc 2-ethylhexanoate, tin(II) chloride, tin(IV) chloride, tin(II) acetate, tin (IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, etc.

These catalysts are used at a ratio of $10^{-9}$ to $10^{-3}$ moles, preferably at a ratio of $10^{-7}$ to $10^{-4}$ moles, relative to 1 mole of total dihydroxy compounds.

Melt polycondensation techniques are intended to conduct melt polycondensation through transesterification reaction using the above starting materials and catalysts under heating and further under normal or reduced pressure while removing by-products.

The melt polycondensation reaction may be conducted either in a continuous manner or in a batch manner. The reaction system for use in this reaction may be a vertical reactor equipped with an anchor-type impeller, a Maxblend impeller, a helical ribbon-type impeller or the like, or may be a horizontal reactor equipped with a paddle impeller, a grid impeller, a spectacle impeller or the like, or may be an extruder-type reactor equipped with a screw. Moreover, it is preferred to use these reactors in combination as appropriate, in consideration of the viscosity of the polymerized product.

In a method for preparing the polycarbonate resin copolymer of the second embodiment, after completion of the polymerization reaction, the catalyst(s) may be removed or deactivated in order to maintain heat stability and hydrolysis stability. Known techniques for catalyst deactivation which involve addition of an acidic substance may preferably be used for this purpose. Specific examples of an acidic substance preferred for use include esters (e.g., butyl benzoate); aromatic sulfonic acids (e.g., p-toluenesulfonic acid); aromatic sulfonic acid esters (e.g., butyl p-toluenesulfonate, hexyl p-toluenesulfonate); phosphoric acid members (e.g., phosphorous acid, phosphoric acid, phosphonic acid); phosphorous acid esters (e.g., triphenyl phosphite, monophenyl phosphite, diphenyl phosphite, diethyl phosphite, di-n-propyl phosphite, di-n-butyl phosphite, di-n-hexyl phosphite, dioctyl phosphite, monooctyl phosphite); phosphoric acid esters (e.g., triphenyl phosphate, diphenyl phosphate, monophenyl phosphate, dibutyl phosphate, dioctyl phosphate, monooctyl phosphate); phosphonic acid members (e.g., diphenylphosphonic acid, dioctylphosphonic acid, dibutylphosphonic acid); phosphonic acid esters (e.g., diethyl phenylphosphonate); phosphines (e.g., triphenylphosphine, bis(diphenylphosphino)ethane); boric acid members (e.g., boric acid, phenylboric acid); aromatic sulfonic acid salts (e.g., dodecylbenzenesulfonic acid tetrabutylphosphonium salt); organic halides (e.g., stearic acid chloride, benzoyl chloride, p-toluenesulfonic acid chloride); alkyl sulfates (e.g., dimethyl sulfate); organic halides (e.g., benzyl chloride), etc. These deactivators are used in 0.01- to 50-fold molar excess, preferably 0.3- to 20-fold molar excess, relative to the amount of the catalyst(s). If the amount used is less than 0.01-fold molar excess relative to the amount of the catalyst(s), it is not preferred because the deactivation effect is not high enough. Likewise, if the amount used is greater than 50-fold molar excess relative to the amount of the catalyst(s), it is not preferred because the heat resistance of the resin is reduced, so that coloration is more likely to occur in the resulting molded articles.

Catalyst deactivation may be followed by a step where low boiling point compounds in the polymer are removed by devolatilization at a pressure of 0.1 to 1 mmHg and at a temperature of 200° C. to 350° C. In this step, a horizontal evaporator equipped with an impeller which is excellent in surface renewal ability (e.g., a paddle impeller, a grid impeller, a spectacle impeller) or a thin film evaporator is preferred for use.

The polycarbonate resin of the second embodiment is desired to be extremely low in the content of contaminants, which is preferably accomplished by filtration of the molten starting materials and/or filtration of the catalyst solution, etc. The mesh size of the filter is preferably 5 µm or less, and more preferably 1 µm or less. Further, the resulting resin is preferably filtered through a polymer filter. The mesh size of the polymer filter is preferably 100 µm or less, and more preferably 30 m or less. Moreover, the step of collecting resin pellets should be conducted, of course, in a low dust environment, which is preferably of class 6 or below, and more preferably of class 5 or below.

(3) Optical Molded Article

The polycarbonate resin copolymer of the second embodiment can be used to produce optical molded articles, which may be molded in any manner, for example, by injection molding, compression molding, extrusion molding, solvent casting, etc. The polycarbonate resin copolymer of the second embodiment is excellent in moldability and heat resistance, and therefore can be advantageously used particularly in optical lenses which are required to be formed by injection molding. During molding, the polycarbonate resin of the second embodiment may be used in admixture with additional polycarbonate resins and/or other types of resins such as polyester resins. Moreover, the polycarbonate resin of the second embodiment may be mixed with additives such as an antioxidant, a processing stabilizer, a light stabilizer, a metal deactivator, a flame retardant, a lubricant, an antistatic agent, a surfactant, an antibacterial agent, a mold release agent, a UV absorber, a plasticizer, a compatibilizer and so on.

Examples of an antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane, etc. The content of such an antioxidant in the polycarbonate resin is preferably 0.001 to 0.3 parts by weight, relative to 100 parts by weight of the polycarbonate resin.

Examples of a processing stabilizer include phosphorus-based processing heat stabilizers, sulfur-based processing heat stabilizers and so on. Examples of phosphorus-based processing heat stabilizers include phosphorous acid, phosphoric acid, phosphonous acid, phosphonic acid, and esters thereof, etc. Specific examples include triphenyl phosphite, tris(nonylphenyl)phosphite, tris(2,4-di-tert-butylphenyl) phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-dicumylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite, etc. The content of such a phosphorus-based processing heat stabilizer in the polycarbonate resin is preferably 0.001 to 0.2 parts by weight, relative to 100 parts by weight of the polycarbonate resin.

Examples of sulfur-based processing heat stabilizers include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, distearyl-3,3'-thiodipropionate, etc. The content of such a sulfur-based processing heat stabilizer in the polycarbonate resin is preferably 0.001 to 0.2 parts by weight, relative to 100 parts by weight of the polycarbonate resin.

A mold release agent preferred for the above purpose is composed of esters formed between alcohols and fatty acids, which constitute 90% by weight or more of the agent. Specific examples of esters formed between alcohols and fatty acids include esters formed between monohydric alcohols and fatty acids, as well as partial or full esters formed between polyhydric alcohols and fatty acids. The above esters formed between monohydric alcohols and fatty acids are preferably esters formed between monohydric alcohols having 1 to 20 carbon atoms and saturated fatty acids having 10 to 30 carbon atoms. Likewise, the partial or full esters formed between polyhydric alcohols and fatty acids are preferably partial or full esters formed between polyhydric alcohols having 1 to 25 carbon atoms and saturated fatty acids having 10 to 30 carbon atoms.

More specifically, such esters formed between monohydric alcohols and saturated fatty acids may be exemplified by stearyl stearate, palmityl palmitate, butyl stearate, methyl laurate, isopropyl palmitate and so on. Such partial or full esters formed between polyhydric alcohols and saturated fatty acids may be exemplified by stearic acid monoglyceride, stearic acid monoglyceride, stearic acid diglyceride, stearic acid triglyceride, stearic acid monosorbitate, behenic acid monoglyceride, capric acid monoglyceride, lauric acid monoglyceride, pentaerythritol monostearate, pentaerythritol tetrastearate, pentaerythritol tetrapelargonate, propyleneglycol monostearate, biphenyl biphenate, sorbitan monostearate, 2-ethylhexyl stearate, as well as full or partial esters of dipentaerythritol, such as dipentaerythritol hexastearate. The content of these mold release agents is preferably in the range of 0.005 to 2.0 parts by weight, more preferably in the range of 0.01 to 0.6 parts by weight, and even more preferably in the range of 0.02 to 0.5 parts by weight, relative to 100 parts by weight of the polycarbonate resin.

A UV absorber preferred for the above purpose is at least one selected from the group consisting of a benzotriazole-based UV absorber, a benzophenone-based UV absorber, a triazine-based UV absorber, a cyclic imino ester-based UV absorber and a cyanoacrylate-based UV absorber. Namely, the UV absorbers listed below may be used either alone or in combination.

Examples of a benzotriazole-based UV absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-ditert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl]benzotriazole, etc.

Examples of a benzophenone-based UV absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxy trihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone, etc.

Examples of a triazine-based UV absorber include 2-(4,6-diphenyl-1,3,5-triazin-2-yl)-5-[(hexyl)oxy]-phenol, 2-(4,6-bis(2,4-dimethylphenyl)-1,3,5-triazin-2-yl)-5-[(octyl)oxy]-phenol, etc.

Examples of a cyclic imino ester-based UV absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one), etc.

Examples of a cyanoacrylate-based UV absorber include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene, etc.

The content of such a UV absorber is preferably 0.01 to 3.0 parts by weight, more preferably 0.02 to 1.0 parts by weight, and even more preferably 0.05 to 0.8 parts by weight, relative to 100 parts by weight of the polycarbonate resin. At a UV absorber content within such a range, weather resistance sufficient for the intended use can be imparted to the polycarbonate resin.

The polycarbonate resin copolymer of the second embodiment shows a high refractive index and excellent heat resistance, and also has flow properties suitable for molding. Further, because of being less likely to cause optical distortion due to its low degree of birefringence, it can be advantageously used not only for optical lenses, but also as an electrically conductive transparent substrate for use in liquid crystal displays, organic EL displays, solar photovoltaic cells and so on, and/or as an optical molded article suitable for use as a structural material or functional material for optical components such as optical disks, liquid crystal panels, optical memory cards, sheets, films, optical fibers, connectors, evaporated plastic reflecting mirrors, displays and so on.

The surface of such an optical molded article may optionally be provided with a coating layer such as an antireflection layer or a hard coat layer. Such an antireflection layer may be composed of a single layer or multiple layers, and may be formed from an organic material or an inorganic material, but is preferably formed from an inorganic material. Specific examples include oxides or fluorides such as silicon oxide, aluminum oxide, zirconium oxide, titanium oxide, cerium oxide, magnesium oxide, magnesium fluoride and so on.

(Optical Lens)

Optical lenses produced by using the polycarbonate resin copolymer of the second embodiment are very useful because they have a high refractive index and are excellent in heat resistance, and therefore can be used in the fields of telescopes, binoculars, television projectors and others where expensive high refractive index glass lenses have been used conventionally. They are preferably used in the form of aspherical lenses, as needed. In the case of aspherical lenses, a single lens achieves substantially zero spherical aberration, which eliminates the need to remove spherical aberration by combining a plurality of spherical lenses, thereby achieving light weight and production cost savings. Thus, aspherical lenses are particularly useful as camera lenses among optical lenses.

Further, optical lenses are molded in any manner, for example, by injection molding, compression molding, injection compression molding, etc. According to the inventions of the second embodiment, aspherical lenses with a high refractive index and a low degree of birefringence can be obtained in a simpler manner, which are technically difficult to process in the case of using glass lenses.

To minimize the entry of contaminants into optical lenses, the environment for molding should also be, of course, a low dust environment, which is preferably of class 6 or below, and more preferably of class 5 or below.

(Optical Film)

Optical films produced by using the polycarbonate resin copolymer of the second embodiment are excellent in transparency and heat resistance, and are therefore preferred for use in films for liquid crystal substrates, optical memory cards and so on.

To minimize the entry of contaminants into optical films, the environment for molding should also be, of course, a low dust environment, which is preferably of class 6 or below, and more preferably of class 5 or below.

EXAMPLES

The second embodiment will be described by way of the following examples, which are not intended to limit the present invention. It should be noted that the measured values in the following examples were determined by using the methods or systems shown below.

1) Weight average molecular weight (Mw) calculated as polystyrene: Gel permeation chromatography (GPC) was used to prepare a calibration curve from polystyrene standards of known molecular weight (molecular weight distribution=1) by using tetrahydrofuran as a developing solvent. Based on this calibration curve, Mw was calculated from the retention time in GPC.

2) Refractive index (nD): This value was measured for a film of 0.1 mm thickness formed from the polycarbonate resin prepared in each example by using an Abbe refractometer in accordance with the method of JIS-K-7142.

3) Abbe's number (ν): Refractive indexes at 23° C. and at wavelengths of 486 nm, 589 nm and 656 nm were measured for a film of 0.1 mm thickness formed from the polycarbonate resin prepared in each example by using an Abbe refractometer, followed by calculation according to the following equation to determine the Abbe's number.

$$\nu = (nD-1)/(nF-nC)$$

nD: refractive index at a wavelength of 589 nm
nC: refractive index at a wavelength of 656 nm
nF: refractive index at a wavelength of 486 nm 4) Glass transition temperature (Tg): This value was measured by using a differential scanning calorimeter (DSC).

5) Optical distortion: A molded piece of 3 mm thickness formed from the polycarbonate resin prepared in each example was sandwiched between two polarizing plates and evaluated in accordance with the crossed Nicols method by being visually observed for light leakage from the back. More specifically, the polycarbonate resins obtained in Examples 1 to 9, the reference example and the comparative example shown below were used and formed into φ50 molded pieces of 3.0 mm thickness by using an injection molding machine ROBOSHOT S-2000i30A (FANUC Corporation, Japan). These molded pieces were each sandwiched between two polarizing plates and evaluated in accordance with the crossed Nicols method by being visually observed for light leakage from the back. The criteria used for evaluation are as follows: A: slight leakage of light, B: certain leakage of light, C: significant leakage of light.

6) Total light transmittance: This value was measured for a film of 0.1 mm thickness formed from the polycarbonate resin prepared in each example by using a turbidimeter NDH2000 (Nippon Denshoku Industries Co., Ltd., Japan).

Example 1

2,2'-Bis(2-hydroxyethoxy)-1,1'-binaphthalene (hereinafter also abbreviated as "BHEBN") represented by formula (E) (4.74 kg, 12.7 moles), 9,9-bis(4-hydroxy-3-phenylphenyl)fluorene (hereinafter also abbreviated as "BPPF") represented by formula (F) (14.9 kg, 29.6 moles), diphenyl carbonate (hereinafter also abbreviated as "DPC") (9.50 kg, 44.3 moles) and sodium bicarbonate ($4.3 \times 10^{-2}$ g, $5.1 \times 10^{-4}$ moles) were introduced into a 50 liter reactor equipped with a stirring unit and a distillation unit, and then melted by being heated to 180° C. under a nitrogen atmosphere. Subsequently, the degree of reduced pressure was adjusted to 20 kPa over 20 minutes. Subsequently, the temperature was elevated to 260° C. at a rate of 20.0° C./hr and the same temperature was kept for 10 minutes, followed by reducing the pressure to 0.13 kPa or less over 80 minutes. The polymerization reaction was continued with stirring for an additional 20 minutes under conditions of 260° C. and 0.13 kPa or less. After completion of the reaction, nitrogen was blown into the reactor to increase the pressure therein, and the resulting polycarbonate resin was then collected while being pelletized.

(E)

(F)

Example 2

The same procedures as shown in Example 1 were repeated to collect the resulting polycarbonate resin, except that the amounts of BHEBN and BPPF were changed as follows: 9.49 kg (25.3 moles) for BHEBN and 8.49 kg (16.9 moles) for BPPF.

Example 3

The same procedures as shown in Example 1 were repeated to collect the resulting polycarbonate resin, except that the amounts of BHEBN and BPPF were changed as follows: 11.0 kg (29.5 moles) for BHEBN and 6.36 kg (12.7 moles) for BPPF.

Example 4

The same procedures as shown in Example 1 were repeated to collect the resulting polycarbonate resin, except that the amounts of BHEBN and BPPF were changed as follows: 12.6 kg (33.8 moles) for BHEBN and 4.24 kg (8.44 moles) for BPPF.

Example 5

The same procedures as shown in Example 1 were repeated to collect the resulting polycarbonate resin, except that the amounts of BHEBN and BPPF were changed as follows: 14.2 kg (38.0 moles) for BHEBN and 2.12 kg (4.22 moles) for BPPF.

Example 6

BHEBN (4.74 kg, 12.7 moles), 9,9-bis(4-hydroxy-3-methylphenyl)fluorene (hereinafter also abbreviated as "BMPF") represented by formula (G) (11.2 kg, 29.6 moles), DPC (9.50 kg, 44.3 moles) and sodium bicarbonate ($4.3 \times 10^{-2}$ g, $5.1 \times 10^{-4}$ moles) were introduced into a 50 liter reactor equipped with a stirring unit and a distillation unit, and then melted by being heated to 180° C. under a nitrogen atmosphere. Subsequently, the degree of reduced pressure was adjusted to 20 kPa over 20 minutes. Subsequently, the temperature was elevated to 260° C. at a rate of 20.0° C./hr and the same temperature was kept for 10 minutes, followed by reducing the pressure to 0.13 kPa or less over 80 minutes. The polymerization reaction was continued with stirring for an additional 20 minutes under conditions of 260° C. and 0.13 kPa or less. After completion of the reaction, nitrogen was blown into the reactor to increase the pressure therein, and the resulting polycarbonate resin was then collected while being pelletized.

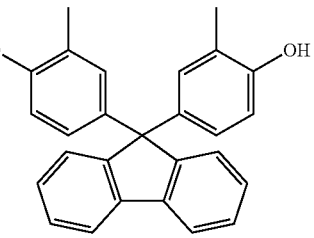
(G)

Example 7

The same procedures as shown in Example 6 were repeated to collect the resulting polycarbonate resin, except that the amounts of BHEBN and BMPF were changed as follows: 7.91 kg (21.2 moles) for BHEBN and 8.00 kg (21.2 moles) for BMPF.

Example 8

The same procedures as shown in Example 6 were repeated to collect the resulting polycarbonate resin, except that the amounts of BHEBN and BMPF were changed as follows: 9.49 kg (25.3 moles) for BHEBN and 6.39 kg (16.9 moles) for BMPF.

Example 9

The same procedures as shown in Example 6 were repeated to collect the resulting polycarbonate resin, except that the amounts of BHEBN and BMPF were changed as follows: 14.2 kg (38.0 moles) for BHEBN and 1.60 kg (4.22 moles) for BMPF.

Reference Example

BHEBN (15.8 kg, 42.2 moles), DPC (9.37 kg, 43.7 moles) and sodium bicarbonate ($5.3 \times 10^{-2}$ g, $6.3 \times 10^{-4}$ moles) were introduced into a 50 liter reactor equipped with a stirring unit and a distillation unit, and then melted by being heated to 180° C. under a nitrogen atmosphere. After the starting materials were melted and then stirred for 110 minutes, the degree of reduced pressure was adjusted to 20 kPa over 20 minutes. Subsequently, the temperature was elevated to 260° C. at a rate of 20.0° C./hr and the same temperature was kept for 10 minutes, followed by reducing the pressure to 0.13 kPa or less over 80 minutes. The polymerization reaction was continued with stirring for an additional 20 minutes under conditions of 260° C. and 0.13 kPa or less. After completion of the reaction, nitrogen was blown into the reactor to increase the pressure therein, and the resulting polycarbonate resin was then collected while being pelletized.

Comparative Example

As a polycarbonate resin consisting of bisphenol A (hereinafter also abbreviated as "BPA"), a resin commercially available under the trade name "Iupilon H-4000" was used (a product of Mitsubishi Engineering-Plastics Corporation, Japan; Mw=33,000, Tg=148° C.).

The polycarbonate resins obtained in Examples 1 to 9, the reference example and the comparative example were used to prepare films of 0.1 mm thickness, and these films were evaluated for refractive index (nD), Abbe's number (ν) and total light transmittance.

The resins obtained in the examples, reference example and comparative example described above were measured for weight average molecular weight (Mw) calculated as polystyrene, glass transition temperature (Tg), refractive index (nD), Abbe's number (ν) and total light transmittance, and the results obtained are shown in Table 2-1.

TABLE 2-1

| | Component ratio | | | | | | | | Evaluation results | |
| | | | | | | | | | Optical | Total light |
| | BHEBN mol % | BPPF mol % | BMPF mol % | BPA mol % | Mw — | Tg ° C. | nD — | ν — | distortion — | transmittance % |
|---|---|---|---|---|---|---|---|---|---|---|
| Example 1 | 30 | 70 | — | — | 13400 | 176 | 1.667 | 21 | B | 87 |
| Example 2 | 60 | 40 | — | — | 18300 | 150 | 1.668 | 20 | B | 87 |
| Example 3 | 70 | 30 | — | — | 23200 | 138 | 1.668 | 20 | A | 87 |
| Example 4 | 80 | 20 | — | — | 26900 | 132 | 1.668 | 19 | A | 87 |
| Example 5 | 90 | 10 | — | — | 32500 | 123 | 1.669 | 19 | A | 87 |
| Example 6 | 30 | — | 70 | — | 14200 | 181 | 1.651 | 22 | B | 88 |
| Example 7 | 50 | — | 50 | — | 18500 | 153 | 1.657 | 21 | A | 88 |
| Example 8 | 60 | — | 40 | — | 20200 | 148 | 1.659 | 20 | A | 88 |
| Example 9 | 90 | — | 10 | — | 34800 | 121 | 1.667 | 19 | A | 87 |
| Reference example | 100 | — | — | — | 32300 | 116 | 1.669 | 19 | A | 87 |
| Comparative example | — | — | — | 100 | 33000 | 148 | 1.586 | 30 | C | 90 |

Third Embodiment

The third embodiment includes the following inventions, by way of example.

[1] A polycarbonate resin copolymer containing structural units represented by general formula (A) and general formula (B'):

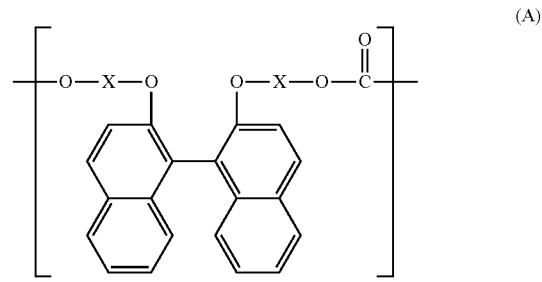

(in formula (A), X is an alkylene group having 1 to 4 carbon atoms), and

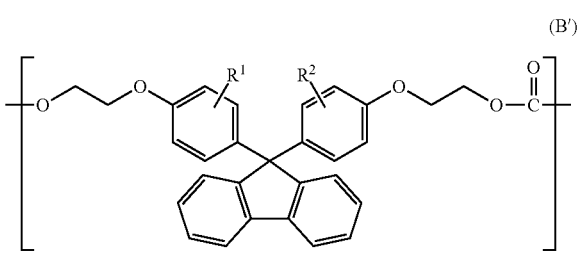

(in formula (B'), $R^1$ and $R^2$ are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[2] The polycarbonate resin copolymer according to [1], wherein the structural unit represented by general formula (A) constitutes 1 to 99 mol % of all structural units.

[3] The polycarbonate resin copolymer according to [1] or [2], wherein the copolymer has a weight average molecular weight Mw of 20000 to 200000.

[4] The polycarbonate resin copolymer according to any one of [1] to [3], wherein the copolymer has a refractive index nD of 1.640 to 1.680 and Abbe's number ν of 24 or less.

[5] The polycarbonate resin copolymer according to any one of [1] to [4], wherein the copolymer has an orientation birefringence Δn of $1.0 \times 10^{-3}$ or less.

[6] The polycarbonate resin copolymer according to any one of [1] to [5], wherein the copolymer has a transition point of 110° C. to 160° C.

[7] The polycarbonate resin copolymer according to any one of [1] to [6], wherein the copolymer has 5% weight loss temperature of 350° C. or higher measured at a rate of temperature rise of 10° C./min.

[8] The polycarbonate resin copolymer according to any one of [1] to [7], wherein the copolymer has a total light transmittance of 88% or more.

[9] An optical molded article, which comprises the polycarbonate resin copolymer according to any one of [1] to [8].

[10] An optical lens, comprising the polycarbonate resin copolymer according to any one of [1] to [8].

[11] An optical film, comprising the polycarbonate resin copolymer according to any one of [1] to [8].

[12] A method for preparing the polycarbonate resin copolymer according to any one of [1] to [8], wherein a compound represented by general formula (C) is used as a starting material:

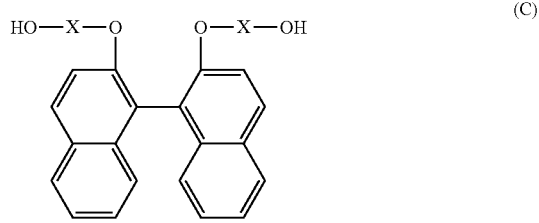

(in formula (C), X is an alkylene group having 1 to 4 carbon atoms).

[13] The method for preparing the polycarbonate resin copolymer according to [12], comprising:

reacting the compound represented by general formula (C), a compound represented by general formula (D') and a carbonic acid diester, and distilling off monohydroxy compounds:

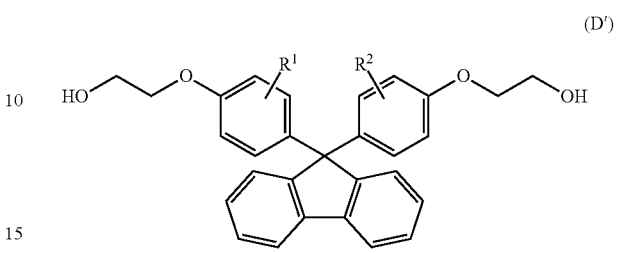

(in formula (D'), $R^1$ and $R^2$ are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[14] The method for preparing the polycarbonate resin copolymer according to [13], wherein the reaction of the compound represented by general formula (C), the compound represented by general formula (D') and the carbonic acid diester is accomplished by melting the compound represented by general formula (C), the compound represented by general formula (D') and the carbonic acid diester, and then reacting them for at least 30 minutes in a state where by-product monohydroxy compounds are kept without being distilled off.

[15] A polycarbonate resin, consisting only of the structural unit represented by general formula (B').

[16] The polycarbonate resin according to [15], wherein the resin has a weight average molecular weight Mw of 20000 to 200000.

[17] The polycarbonate resin according to [15] or [16], wherein the resin has a refractive index nD of 1.640 to 1.680 and Abbe's number ν of 24 or less.

[18] The polycarbonate resin according to any one of [15] to [17], wherein the resin has an orientation birefringence Δn of $1.0 \times 10^{-3}$ or less.

[19] The polycarbonate resin according to any one of [15] to [18], wherein the resin has a glass transition point of 110° C. to 180° C.

[20] The polycarbonate resin according to any one of [15] to [19], wherein the resin has 5% weight loss temperature of 350° C. or higher measured at a rate of temperature rise of 10° C./min.

[21] The polycarbonate resin according to any one of [15] to [20], wherein the resin has a total light transmittance of 85% or more.

[22] An optical molded article, comprising the polycarbonate resin according to any one of [15] to [21].

[23] An optical lens, comprising the polycarbonate resin according to any one of [15] to [21].

[24] An optical film, comprising the polycarbonate resin according to any one of [15] to [21].

[25] A method for preparing the polycarbonate resin according to any one of [15] to [21], comprising:

reacting a compound represented by general formula (D') and a carbonic acid diester, and distilling off monohydroxy compounds:

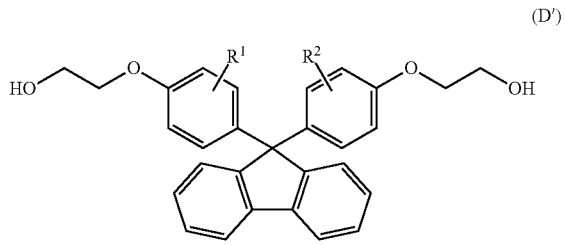

(D')

(in formula (D'), $R^1$ and $R^2$ are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

[26] The method for preparing the polycarbonate resin according to [25], wherein the reaction of the compound represented by general formula (D') and the carbonic acid diester is accomplished by melting the compound represented by general formula (D') and the carbonic acid diester, and then reacting them for at least 30 minutes in a state where byproduct monohydroxy compounds are kept without being distilled off.

The above inventions will be described in more detail below.

(1) Polycarbonate Resin

The copolymer of the third embodiment is a polycarbonate resin containing a structural unit represented by formula (A) (hereinafter referred to as "structural unit (A)") and a structural unit represented by formula (B') (hereinafter referred to as "structural unit (B')") (when the resin is a copolymer, it is also hereinafter referred to as "the polycarbonate resin copolymer of the third embodiment").

The ratio of the above structural unit (A) is preferably 1 to 99 mol %, relative to all the carbonate structural units constituting the polycarbonate resin of the third embodiment.

More preferably, the ratio of the above structural unit (A) is 30 to 90 mol %, and even more preferably 40 to 80 mol %, relative to all the carbonate structural units constituting the polycarbonate resin of the third embodiment.

Alternatively, the resin of the third embodiment may be a polycarbonate resin, which consists only of the structural unit represented by general formula (B').

The polycarbonate resin of the third embodiment preferably has a weight average molecular weight (Mw) of 20000 to 200000 when calculated as polystyrene.

More preferably, it has a weight average molecular weight (Mw) of 25000 to 120000 when calculated as polystyrene.

If Mw is less than 20000, it is not preferred because the resulting molded articles will become brittle. If Mw is greater than 200000, it is not preferred because the prepared resin will be difficult to collect due to increased melt viscosity and further will be difficult to mold by injection in a molten state due to reduced flow properties.

The polycarbonate resin copolymer of the third embodiment is a polycarbonate resin copolymer comprising a random, block or alternating copolymer structure.

The polycarbonate resin of the third embodiment has a refractive index (nD) of preferably 1.640 to 1.680, more preferably 1.645 to 1.675, and even more preferably 1.650 to 1.670, when measured at 23° C. and at a wavelength of 589 nm. The polycarbonate resin of the third embodiment has a high refractive index (nD) and is therefore suitable for use as a material for optical lenses. The refractive index can be measured for a film of 0.1 mm thickness using an Abbe refractometer in accordance with the method of JIS-K-7142.

The polycarbonate resin of the third embodiment has an Abbe's number (ν) of preferably 24 or less, more preferably 23 or less, and even more preferably 22 or less. The Abbe's number can be calculated from the refractive indexes measured at 23° C. and at wavelengths of 486 nm, 589 nm and 656 nm, according to the following equation.

$$\nu = (nD-1)/(nF-nC)$$

nD: refractive index at a wavelength of 589 nm
nC: refractive index at a wavelength of 656 nm
nF: refractive index at a wavelength of 486 nm When the resin of the third embodiment is used for injection molding, its preferred glass transition point (Tg) is 95° C. to 180° C., more preferably 110° C. to 170° C., and even more preferably 115° C. to 160° C. If Tg is lower than 95° C., it is not preferred because the temperature range available for use becomes narrow. Likewise, if Tg exceeds 180° C., it is not preferred because the melt temperature of the resin becomes higher, so that decomposition and/or coloration is more likely to occur in the resin. If the resin has too high a glass transition point, the difference between the mold temperature and the resin's glass transition temperature becomes larger in a commonly used mold temperature controller. For this reason, in applications where precise surface accuracy is required for the resulting products, resins having too high a glass transition temperature are difficult to use and therefore are not preferred.

In the polycarbonate resin of the third embodiment, the 5% weight loss temperature (Td) measured at a rate of temperature rise of 10° C./min is preferably 350° C. or higher, which serves as an indicator for heat stability required to withstand heating during injection molding. If the 5% weight loss temperature is lower than 350° C., it is not preferred because good molded articles are difficult to obtain due to severe thermal decomposition during molding.

In the polycarbonate resin of the third embodiment, the orientation birefringence ($\Delta n$) serving as a scale for the amount of birefringence is preferably $1.0 \times 10^{-3}$ or less, more preferably $0.8 \times 10^{-3}$ or less, even more preferably $0.3 \times 10^{-3}$ or less, and particularly preferably $0.2 \times 10^3$ or less.

$\Delta n$ can be determined as follows: a cast film of 0.1 mm thickness is cut out into a square of 5.0 cm per side, and the film is then clamped at the both ends with chucks (distance between the chucks: 3.0 cm), stretched 1.5-fold at a temperature of the polycarbonate resin's Tg+5° C. and measured for phase difference (Re) at 589 nm using an ellipsometer M-220 (JASCO Corporation, Japan), followed by calculation according to the following equation.

$$\Delta n = Re/d$$

$\Delta n$: orientation birefringence
Re: phase difference
d: thickness

The sign of birefringence ($\Delta n$) is represented by the following equation with the use of the refractive index ($n_{//}$) in the stretching direction of the film and the refractive index ($n_\perp$) in the direction perpendicular to the stretching direction. If $\Delta n$ is positive, it is called positive birefringence, while if $\Delta n$ is negative, it is called negative birefringence.

$$\Delta n = n_{//} - n_\perp$$

Optical molded articles obtained using the polycarbonate resin of the third embodiment have a total light transmittance of preferably 85% or more, more preferably 88% or more, which compares favorably with that of bisphenol A type polycarbonate resins, etc.

The polycarbonate resin of the third embodiment is preferably further supplemented with an antioxidant, a mold release agent, a UV absorber, a flow improver, a crystal nucleating agent, a reinforcing agent, a dye, an antistatic agent or an antibacterial agent, etc.

(2) Method for Preparing Polycarbonate Resin

The polycarbonate resin of the third embodiment can be prepared using compound (C) as a starting material. More specifically, compound (C), compound (D') and a carbonate precursor (e.g., a carbonic acid diester) may be reacted in the presence of a basic compound catalyst or a transesterification catalyst or a mixture of both catalysts or in the absence of any catalyst by melt polycondensation techniques to prepare the desired polycarbonate resin. When the polycarbonate resin of the third embodiment is a polycarbonate resin consisting only of the structural unit represented by general formula (B'), it can be prepared in the same manner as described above, except that compound (C) is not used.

Examples of a dihydroxy compound represented by formula (C) include 2,2'-bis(1-hydroxymethoxy)-1,1'-binaphthyl, 2,2'-bis(2-hydroxyethoxy)-1,1'-binaphthyl, 2,2'-bis(3-hydroxypropyloxy)-1,1'-binaphthyl, 2,2'-bis(4-hydroxybutoxy)-1,1'-binaphthyl and so on. Among them, preferred is 2,2'-bis(2-hydroxyethoxy)-1,1'-binaphthyl. These compounds may be used either alone or in combination.

Examples of a dihydroxy compound represented by formula (D') include 9,9-bis(4-(2-hydroxyethoxyl)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene and so on. Among them, preferred is 9,9-bis(4-(2-hydroxyethoxyl)phenyl)fluorene. These compounds may be used either alone or in combination.

Examples of a carbonic acid diester for use in the third embodiment include diphenyl carbonate, ditolyl carbonate, bis(chlorophenyl) carbonate, m-cresyl carbonate, dimethyl carbonate, diethyl carbonate, dibutyl carbonate, dicyclohexyl carbonate and so on. Among them, particularly preferred is diphenyl carbonate. Diphenyl carbonate is preferably used at a ratio of 0.97 to 1.20 moles, more preferably at a ratio of 0.98 to 1.10 moles, relative to 1 mole of total dihydroxy compound(s).

Examples of a basic compound catalyst particularly include alkali metal compounds, alkaline earth metal compounds, and nitrogen-containing compounds, etc.

Examples of alkali metal compounds for use in the present invention include organic acid salts, inorganic salts, oxides, hydroxides, hydrides or alkoxides of alkali metals. Specific examples available for use include sodium hydroxide, potassium hydroxide, cesium hydroxide, lithium hydroxide, sodium bicarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, as well as a disodium salt, a dipotassium salt, a dicesium salt or a dilithium salt of bisphenol A, a sodium salt, a potassium salt, a cesium salt or a lithium salt of phenol, etc.

Examples of alkaline earth metal compounds include organic acid salts, inorganic salts, oxides, hydroxides, hydrides or alkoxides of alkaline earth metal compounds. Specific examples available for use include magnesium hydroxide, calcium hydroxide, strontium hydroxide, barium hydroxide, magnesium bicarbonate, calcium bicarbonate, strontium bicarbonate, barium bicarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, etc.

Examples of nitrogen-containing compounds include quaternary ammonium hydroxides and salts thereof, amines and so on. Specific examples available for use include quaternary ammonium hydroxides having alkyl groups, aryl groups and other groups (e.g., tetramethyl ammonium hydroxide, tetraethyl ammonium hydroxide, tetrapropyl ammonium hydroxide, tetrabutyl ammonium hydroxide, trimethyl benzyl ammonium hydroxide); tertiary amines (e.g., triethylamine, dimethylbenzylamine, triphenylamine); secondary amines (e.g., diethylamine, dibutylamine); primary amines (e.g., propylamine, butylamine); imidazoles (e.g., 2-methylimidazole, 2-phenylimidazole, benzoimidazole); as well as bases or basic salts (e.g., ammonia, tetramethyl ammonium borohydride, tetrabutyl ammonium borohydride, tetrabutyl ammonium tetraphenylborate, tetraphenyl ammonium tetraphenylborate), etc.

Transesterification catalysts preferred for use are salts of zinc, tin, zirconium, lead and so on, which may be used either alone or in combination.

Specific examples of transesterification catalysts available for use include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, etc.

These catalysts are used at a ratio of $10^{-9}$ to $10^{-3}$ moles, preferably at a ratio of $10^{-7}$ to $10^{-4}$ moles, relative to 1 mole of total dihydroxy compound(s).

Melt polycondensation techniques are intended to conduct melt polycondensation through transesterification reaction using the above starting materials and catalysts under heating and further under normal or reduced pressure while removing by-products.

For melt polycondensation in this compositional system, a compound represented by general formula (C), a compound represented by general formula (D') and a carbonic acid diester may be melted in a reaction vessel and then reacted in a state where by-product monohydroxy compounds are kept without being distilled off. The reaction time is 20 minutes to 240 minutes, preferably 40 minutes to 180 minutes, and particularly preferably 60 minutes to 150 minutes. During this step, if the by-product monohydroxy compounds are distilled off immediately upon their generation, the finally obtained polycarbonate resin is low in the content of high molecular weight components.

The melt polycondensation reaction may be conducted either in a continuous manner or in a batch manner. The reaction system for use in this reaction may be a vertical reactor equipped with an anchor-type impeller, a Maxblend impeller, a helical ribbon-type impeller or the like, or may be a horizontal reactor equipped with a paddle impeller, a grid impeller, a spectacle impeller or the like, or may be an extruder-type reactor equipped with a screw. Moreover, it is preferred to use these reactors in combination as appropriate, in consideration of the viscosity of the polymerized product.

In a method for preparing the polycarbonate resin of the third embodiment, after completion of the polymerization reaction, the catalyst(s) may be removed or deactivated in order to maintain heat stability and hydrolysis stability. Known techniques for catalyst deactivation which involve addition of an acidic substance may preferably be used for this purpose. Specific examples of an acidic substance preferred for use include esters (e.g., butyl benzoate); aromatic sulfonic acids (e.g., p-toluenesulfonic acid); aromatic sulfonic acid esters (e.g., butyl p-toluenesulfonate, hexyl p-toluenesulfonate); phosphoric acid members (e.g., phosphorous acid, phosphoric acid, phosphonic acid); phosphorous acid esters (e.g., triphenyl phosphite, monophenyl phosphite, diphenyl phosphite, diethyl phosphite, di-n-propyl phosphite, di-n-butyl phosphite, di-n-hexyl phosphite, dioctyl phosphite, monooctyl phosphite); phosphoric acid esters (e.g., triphenyl phosphate, diphenyl phosphate, monophenyl phosphate, dibutyl phosphate, dioctyl phosphate, monooctyl phosphate); phosphonic acid members (e.g., diphenylphosphonic acid, dioctylphosphonic acid, dibutylphosphonic acid); phosphonic acid esters (e.g., diethyl phenylphosphonate); phosphines (e.g., triphenylphosphine, bis(diphenylphosphino)ethane); boric acid members (e.g., boric acid, phenylboric acid); aromatic sulfonic acid salts (e.g., dodecylbenzenesulfonic acid tetrabutylphosphonium salt); organic halides (e.g., stearic acid chloride, benzoyl chloride, p-toluenesulfonic acid chloride); alkyl sulfates (e.g., dimethyl sulfate); organic halides (e.g., benzyl chloride), etc. These deactivators are used in 0.01- to 50-fold molar excess, preferably 0.3- to 20-fold molar excess, relative to the amount of the catalyst(s). If the amount used is less than 0.01-fold molar excess relative to the amount of the catalyst(s), it is not preferred because the deactivation effect is not high enough. Likewise, if the amount used is greater than 50-fold molar excess relative to the amount of the catalyst(s), it is not preferred because the heat resistance of the resin is reduced, so that coloration is more likely to occur in the resulting molded articles.

Catalyst deactivation may be followed by a step where low boiling point compounds in the polymer are removed by devolatilization at a pressure of 0.1 to 1 mmHg and at a temperature of 200° C. to 350° C. In this step, a horizontal evaporator equipped with an impeller which is excellent in surface renewal ability (e.g., a paddle impeller, a grid impeller, a spectacle impeller) or a thin film evaporator is preferred for use.

The polycarbonate resin of the third embodiment is desired to be extremely low in the content of contaminants, which is preferably accomplished by filtration of the molten starting materials and/or filtration of the catalyst solution, etc. The mesh size of the filter is preferably 5 μm or less, and more preferably 1 μm or less. Further, the resulting resin is preferably filtered through a polymer filter. The mesh size of the polymer filter is preferably 100 μm or less, and more preferably 30 μm or less. Moreover, the step of collecting resin pellets should be conducted, of course, in a low dust environment, which is preferably of class 6 or below, and more preferably of class 5 or below.

(3) Optical Molded Article

The polycarbonate resin of the third embodiment can be used to produce optical molded articles, which may be molded in any manner, for example, by injection molding, compression molding, extrusion molding, solvent casting, etc. The polycarbonate resin of the third embodiment is excellent in moldability and heat resistance, and therefore can be advantageously used particularly in optical lenses which are required to be formed by injection molding. During molding, the polycarbonate resin of the third embodiment may be used in admixture with additional polycarbonate resins and/or other types of resins such as polyester resins. Moreover, the polycarbonate resin of the third embodiment may be mixed with additives such as an antioxidant, a processing stabilizer, a light stabilizer, a metal deactivator, a flame retardant, a lubricant, an antistatic agent, a surfactant, an antibacterial agent, a mold release agent, a UV absorber, a plasticizer, a compatibilizer and so on.

Examples of an antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[3-(3-tert-butyl-4-hydroxy-5-methylphenyl)propionyloxy]ethyl}-2,4,8,10-tetraoxaspiro(5,5)undecane, etc. The content of such an antioxidant in the polycarbonate resin is preferably 0.001 to 0.3 parts by weight, relative to 100 parts by weight of the polycarbonate resin.

Examples of a processing stabilizer include phosphorus-based processing heat stabilizers, sulfur-based processing heat stabilizers and so on. Examples of phosphorus-based processing heat stabilizers include phosphorous acid, phosphoric acid, phosphonous acid, phosphonic acid, and esters thereof, etc. Specific examples include triphenyl phosphite, tris(nonylphenyl)phosphite, tris(2,4-di-tert-butylphenyl) phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-dicumylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite, etc. The content of such a phosphorus-based processing heat stabilizer in the polycarbonate resin is preferably 0.001 to 0.2 parts by weight, relative to 100 parts by weight of the polycarbonate resin.

Examples of sulfur-based processing heat stabilizers include pentaerythritol-tetrakis(3-laurylthiopropionate), pentaerythritol-tetrakis(3-myristylthiopropionate), pentaerythritol-tetrakis(3-stearylthiopropionate), dilauryl-3,3'-thiodipropionate, dimyristyl-3,3'-thiodipropionate, distearyl-3,3'-thiodipropionate, etc. The content of such a sulfur-based processing heat stabilizer in the polycarbonate resin is preferably 0.001 to 0.2 parts by weight, relative to 100 parts by weight of the polycarbonate resin.

A mold release agent preferred for the above purpose is composed of esters formed between alcohols and fatty acids, which constitute 90% by weight or more of the agent. Specific examples of esters formed between alcohols and fatty acids include esters formed between monohydric alcohols and fatty acids, as well as partial or full esters formed between polyhydric alcohols and fatty acids. The above esters formed between monohydric alcohols and fatty acids are preferably esters formed between monohydric alcohols having 1 to 20 carbon atoms and saturated fatty acids having 10 to 30 carbon atoms. Likewise, the partial or full esters formed between polyhydric alcohols and fatty acids are preferably partial or full esters formed between polyhydric alcohols having 1 to 25 carbon atoms and saturated fatty acids having 10 to 30 carbon atoms.

More specifically, such esters formed between monohydric alcohols and saturated fatty acids may be exemplified by stearyl stearate, palmityl palmitate, butyl stearate, methyl laurate, isopropyl palmitate and so on. Such partial or full esters formed between polyhydric alcohols and saturated fatty acids may be exemplified by stearic acid monoglyceride, stearic acid monoglyceride, stearic acid diglyceride, stearic acid triglyceride, stearic acid monosorbitate, behenic acid monoglyceride, capric acid monoglyceride, lauric acid monoglyceride, pentaerythritol monostearate, pentaerythritol tetrastearate, pentaerythritol tetrapelargonate, propyleneglycol monostearate, biphenyl biphenate, sorbitan monostearate, 2-ethylhexyl stearate, as well as full or partial esters of dipentaerythritol, such as dipentaerythritol hexastearate. The content of these mold release agents is preferably in the range of 0.005 to 2.0 parts by weight, more preferably in the range of 0.01 to 0.6 parts by weight, and even more preferably in the range of 0.02 to 0.5 parts by weight, relative to 100 parts by weight of the polycarbonate resin.

A UV absorber preferred for the above purpose is at least one selected from the group consisting of a benzotriazole-based UV absorber, a benzophenone-based UV absorber, a triazine-based UV absorber, a cyclic imino ester-based UV absorber and a cyanoacrylate-based UV absorber. Namely, the UV absorbers listed below may be used either alone or in combination.

Examples of a benzotriazole-based UV absorber include 2-(2-hydroxy-5-methylphenyl)benzotriazole, 2-(2-hydroxy-5-tert-octylphenyl)benzotriazole, 2-(2-hydroxy-3,5-di-cumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl]benzotriazole, etc.

Examples of a benzophenone-based UV absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxy trihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone, etc.

Examples of a triazine-based UV absorber include 2-(4,6-diphenyl-1,3,5-triazin-2-yl)-5-[(hexyl)oxy]-phenol, 2-(4,6-bis(2,4-dimethylphenyl)-1,3,5-triazin-2-yl)-5-[(octyl)oxy]-phenol, etc.

Examples of a cyclic imino ester-based UV absorber include 2,2'-bis(3,1-benzoxazin-4-one), 2,2'-p-phenylenebis (3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one), etc.

Examples of a cyanoacrylate-based UV absorber include 1,3-bis-[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene, etc.

The content of such a UV absorber is preferably 0.01 to 3.0 parts by weight, more preferably 0.02 to 1.0 parts by weight, and even more preferably 0.05 to 0.8 parts by weight, relative to 100 parts by weight of the polycarbonate resin. At a UV absorber content within such a range, weather resistance sufficient for the intended use can be imparted to the polycarbonate resin.

The polycarbonate resin of the third embodiment shows a high refractive index and excellent heat resistance, and also has flow properties suitable for molding. Further, because of being less likely to cause optical distortion due to its low degree of birefringence, it can be advantageously used not only for optical lenses, but also as an electrically conductive transparent substrate for use in liquid crystal displays, organic EL displays, solar photovoltaic cells and so on, and/or as an optical molded article suitable for use as a structural material or functional material for optical components such as optical disks, liquid crystal panels, optical memory cards, sheets, films, optical fibers, connectors, evaporated plastic reflecting mirrors, displays and so on.

The surface of such an optical molded article may optionally be provided with a coating layer such as an antireflection layer or a hard coat layer. Such an antireflection layer may be composed of a single layer or multiple layers, and may be formed from an organic material or an inorganic material, but is preferably formed from an inorganic material. Specific examples include oxides or fluorides such as silicon oxide, aluminum oxide, zirconium oxide, titanium oxide, cerium oxide, magnesium oxide, magnesium fluoride and so on.

(Optical Lens)

Optical lenses produced by using the polycarbonate resin of the third embodiment are very useful because they have a high refractive index and are excellent in heat resistance, and therefore can be used in the fields of telescopes, binoculars, television projectors and others where expensive high refractive index glass lenses have been used conventionally. They are preferably used in the form of aspherical lenses, as needed. In the case of aspherical lenses, a single lens achieves substantially zero spherical aberration, which eliminates the need to remove spherical aberration by combining a plurality of spherical lenses, thereby achieving light weight and production cost savings. Thus, aspherical lenses are particularly useful as camera lenses among optical lenses.

Further, optical lenses are molded in any manner, for example, by injection molding, compression molding, injection compression molding, etc. According to the inventions of the third embodiment, aspherical lenses with a high refractive index and a low degree of birefringence can be obtained in a simpler manner, which are technically difficult to process in the case of using glass lenses.

To minimize the entry of contaminants into optical lenses, the environment for molding should also be, of course, a low dust environment, which is preferably of class 6 or below, and more preferably of class 5 or below.

(Optical Film)

Optical films produced by using the polycarbonate resin of the third embodiment are excellent in transparency and heat resistance, and are therefore preferred for use in films for liquid crystal substrates, optical memory cards and so on.

To minimize the entry of contaminants into optical films, the environment for molding should also be, of course, a low dust environment, which is preferably of class 6 or below, and more preferably of class 5 or below.

It should be noted that in addition to the above optical molded articles, other applications include optical fibers, optical disks, automobile tail lamps and/or meter covers, as well as artificial marble comprising an appropriate filler (e.g., silica), etc.

EXAMPLES

The third embodiment will be described by way of the following examples, which are not intended to limit the present invention. It should be noted that the measured values in the following examples were determined by using the methods or systems shown below.

1) Weight average molecular weight (Mw) calculated as polystyrene: GPC was used to prepare a calibration curve from polystyrene standards of known molecular weight (molecular weight distribution=1) by using tetrahydrofuran as a developing solvent. Based on this calibration curve, Mw was calculated from the retention time in GPC.

2) Refractive index (nD): This value was measured for a film of 0.1 mm thickness formed from the polycarbonate resin prepared in each example by using an Abbe refractometer in accordance with the method of JIS-K-7142.

3) Abbe's number (ν): Refractive indexes at 23° C. and at wavelengths of 486 nm, 589 nm and 656 nm were measured for a film of 0.1 mm thickness formed from the polycarbonate resin prepared in each example by using an Abbe refractometer, followed by calculation according to the following equation to determine the Abbe's number.

$$\nu=(nD-1)/(nF-nC)$$

nD: refractive index at a wavelength of 589 nm nC: refractive index at a wavelength of 656 nm nF: refractive index at a wavelength of 486 nm 4) Glass transition temperature (Tg): This value was measured by using a differential scanning calorimeter (DSC).

5) Thermal decomposition initiation temperature (Td): A differential thermobalance (TG-DTA) was used to measure a 5% weight loss temperature under an air stream. The rate of temperature rise is set to 10° C./min.

6) Orientation birefringence (Δn): A cast film of 0.1 mm thickness was cut out into a square of 5.0 cm per side, and the film was then clamped at the both ends with chucks (distance between the chucks: 3.0 cm) and stretched 1.5-fold at a temperature of the polycarbonate resin's Tg+5° C. The stretched film was measured for phase difference (Re) at 589 nm using an ellipsometer M-220 (JASCO Corporation, Japan), followed by calculation according to the following equation to determine the orientation birefringence (Δn).

$$\Delta n = Re/d$$

Δn: orientation birefringence

Re: phase difference d: thickness

Moreover, the above stretched film was measured using an ellipsometer M-220 (JASCO Corporation, Japan) to determine its direction showing the maximum in-plane refractive index, and the sign of birefringence was determined based on the relationship between the thus determined direction and the stretching direction.

The sign of birefringence is positive if the stretching direction is the same as the direction in which the film shows the maximum in-plane refractive index.

The sign of birefringence is negative if the stretching direction is perpendicular to the direction in which the film shows the maximum in-plane refractive index.

7) Total light transmittance: This value was measured for a film of 0.1 mm thickness formed from the polycarbonate resin prepared in each example by using a turbidimeter NDH2000 (Nippon Denshoku Industries Co., Ltd., Japan) in accordance with the method of JIS-K-7361-1.

(1-1) Preparation of Polycarbonate Resins

Example 1

2,2'-Bis(2-hydroxyethoxy)-1,1'-binaphthyl (hereinafter also abbreviated as "BHEBN") (13.4 g, 0.035 moles), 9,9-bis(4-(2-hydroxyethoxyl)phenyl)fluorene (hereinafter also abbreviated as "BPEF") (35.6 g, 0.081 moles), diphenyl carbonate (hereinafter also abbreviated as "DPC") (25.0 g, 0.117 moles) and sodium bicarbonate ($8.8\times10^{-5}$ g, $1.0\times10^{-6}$ moles) were introduced into a 300 ml four-necked flask equipped with a stirring unit and a distillation unit, and then heated to 180° C. under a nitrogen atmosphere at 760 mmHg. At 10 minutes after initiation of heating, the starting materials were confirmed to be completely dissolved, followed by stirring for 110 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

Example 2

The same procedures as shown in Example 1 were repeated to collect the resulting polycarbonate resin, except that the amounts of BHEBN, BPEF, DPC and sodium bicarbonate were changed as follows: 17.1 g (0.046 moles) for BHEBN, 30.1 g (0.069 moles) for BPEF, 17.1 g (0.046 moles) for DPC and $8.7\times10^{-5}$ g ($1.0\times10^{-6}$ moles) for sodium bicarbonate.

Example 3

The same procedures as shown in Example 1 were repeated to collect the resulting polycarbonate resin, except that the amounts of BHEBN, BPEF, DPC and sodium bicarbonate were changed as follows: 30.0 g (0.080 moles) for BHEBN, 15.1 g (0.034 moles) for BPEF, 25.0 g (0.117 moles) for DPC and $8.7 \times 10^{-5}$ g ($1.0 \times 10^{-6}$ moles) for sodium bicarbonate.

Example 4

The same procedures as shown in Example 1 were repeated to collect the resulting polycarbonate resin, except that the amounts of BHEBN, BPEF, DPC and sodium bicarbonate were changed as follows: 38.9 g (0.104 moles) for BHEBN, 5.07 g (0.012 moles) for BPEF, 25.0 g (0.117 moles) for DPC and $1.1 \times 10^{-4}$ g ($1.3 \times 10^{-6}$ moles) for sodium bicarbonate.

Example 5

The same procedures as shown in Example 1 were repeated to collect the resulting polycarbonate resin, except that after the starting materials were heated to 180° C. under a nitrogen atmosphere at 760 mmHg and confirmed to be completely dissolved, the time required for the subsequent stirring operation under the same conditions was shortened from 110 minutes to 30 minutes.

Example 6

BPEF (49.7 g, 0.113 moles), diphenyl carbonate (25.0 g, 0.117 moles) and sodium bicarbonate ($8.7 \times 10^{-5}$ g, $1.0 \times 10^{-6}$ moles) were introduced into a 300 ml four-necked flask equipped with a stirring unit and a distillation unit, and then heated to 180° C. under a nitrogen atmosphere at 760 mmHg.

At 10 minutes after initiation of heating, the starting materials were confirmed to be completely dissolved, followed by stirring for 20 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

Comparative Example 1

As a polycarbonate resin consisting of bisphenol A (hereinafter also abbreviated as "BPA"), a resin commercially available under the trade name "Iupilon H-4000" was used (a product of Mitsubishi Engineering-Plastics Corporation, Japan; Mw=33,000, Tg=148° C.).

(1-2) Production of Optical Films

The polycarbonate resins obtained in Examples 1 to 6 and Comparative Example 1 were dissolved in methylene chloride to prepare resin solutions each having a solid content of 5.3% by weight. These resin solutions were each poured into a mold for cast film formation and the methylene chloride was volatilized, followed by peeling and drying to prepare a cast film of 0.1 mm thickness. The thus prepared cast films were evaluated for refractive index (nD), Abbe's number (ν) and total light transmittance. Moreover, the resulting cast films were each stretched 1.5-fold at a temperature of Tg+5° C. and evaluated for orientation birefringence (Δn).

It should be noted that the polycarbonate resin obtained in Example 5 was brittle due to its low molecular weight and was not able to be formed into a cast film.

The resins obtained in the examples and comparative example described above were measured for weight average molecular weight (Mw) calculated as polystyrene, glass transition temperature (Tg) and thermal decomposition initiation temperature (Td), and the results obtained are shown in Table 3-1 and Table 3-2. In addition, the criteria used for evaluation of orientation birefringence (Δn) in Table 3-2 are shown in Table 3-3.

TABLE 3-1

| | Component ratio | | | Physical properties | | | | | |
|---|---|---|---|---|---|---|---|---|---|
| | BHEBN mol % | BPPF mol % | BPA mol % | Mw — | Tg °C. | Td °C. | nD — | ν — | Total light transmittance % |
| Example 1 | 30 | 70 | — | 105000 | 141 | 368 | 1.647 | 22 | 89 |
| Example 2 | 40 | 60 | — | 44000 | 135 | 366 | 1.650 | 22 | 89 |
| Example 3 | 70 | 30 | — | 56000 | 123 | 363 | 1.659 | 21 | 88 |
| Example 4 | 90 | 10 | — | 53000 | 120 | 361 | 1.665 | 20 | 88 |
| Example 5 | 30 | 70 | — | 4000 | 75 | 324 | — | — | — |
| Example 6 | — | 100 | — | 31000 | 149 | 370 | 1.639 | 23 | 89 |
| Comparative Example 1 | — | — | 100 | 33000 | 148 | — | 1.589 | 30 | 91 |

TABLE 3-2

| | Component ratio | | | Birefringence | |
|---|---|---|---|---|---|
| | | | | Orientation | |
| | BHEBN mol % | BPPF mol % | BPA mol % | birefringence Δn | Sign of birefringence |
| Example 1 | 30 | 70 | — | $0.28 \times 10^{-3}$ | Negative |
| Example 2 | 40 | 60 | — | $0.11 \times 10^{-3}$ | Negative |
| Example 3 | 70 | 30 | — | $0.02 \times 10^{-3}$ | Negative |
| Example 4 | 90 | 10 | — | $0.18 \times 10^{-3}$ | Positive |
| Example 5 | 30 | 70 | — | — | — |
| Example 6 | — | 100 | — | $0.83 \times 10^{-3}$ | Negative |
| Comparative Example 1 | — | — | 100 | $9.5 \times 10^{-3}$ | Positive |

TABLE 3-3

| Orientation birefringence Δn (×10$^{-3}$) | Evaluation |
| --- | --- |
| 0 to 0.1 | Extremely very small |
| Greater than 0.1 to 0.4 | Very small |
| Greater than 0.4 to 1.0 | Small |
| Greater than 1.0 | Large |

(2-1) Preparation of Polycarbonate Resins

Example 7

2,2'-Bis(2-hydroxyethoxy)-1,1'-binaphthalene (hereinafter also abbreviated as "BHEBN") (3.44 g, 0.009 moles), 9,9-bis(4-(2-hydroxyethoxy)-3-phenylphenyl)fluorene (hereinafter also abbreviated as "BEPF") (48.9 g, 0.083 moles), diphenyl carbonate (hereinafter also abbreviated as "DPC") (20.3 g, 0.095 moles) and sodium bicarbonate (1.5×10$^{-4}$ g, 1.8×10$^{-6}$ moles) were introduced into a 300 ml four-necked flask equipped with a stirring unit and a distillation unit, and then heated to 180° C. under a nitrogen atmosphere at 760 mmHg. At 10 minutes after initiation of heating, the starting materials were confirmed to be completely dissolved, followed by stirring for 110 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

Example 8

The same procedures as shown in Example 1 were repeated to collect the resulting polycarbonate resin, except that the amounts of BHEBN, BEPF, DPC and sodium bicarbonate were changed as follows: 5.17 g (0.014 moles) for BHEBN, 19.0 g (0.032 moles) for BEPF, 10.0 g (0.047 moles) for DPC and 9.7×10$^{-5}$ g (1.2×10$^{-6}$ moles) for sodium bicarbonate.

Example 9

The same procedures as shown in Example 1 were repeated to collect the resulting polycarbonate resin, except that the amounts of BHEBN, BEPF, DPC and sodium bicarbonate were changed as follows: 13.8 g (0.037 moles) for BHEBN, 32.6 g (0.055 moles) for BEPF, 20.0 g (0.093 moles) for DPC and 1.5×10$^{-4}$ g (1.8×10$^{-6}$ moles) for sodium bicarbonate.

Example 10

The same procedures as shown in Example 1 were repeated to collect the resulting polycarbonate resin, except that the amounts of BHEBN, BEPF, DPC and sodium bicarbonate were changed as follows: 24.4 g (0.065 moles) for BHEBN, 16.5 g (0.028 moles) for BEPF, 20.2 g (0.094 moles) for DPC and 1.6×10$^{-4}$ g (1.9×10$^{-6}$ moles) for sodium bicarbonate.

Example 11

The same procedures as shown in Example 1 were repeated to collect the resulting polycarbonate resin, except that the amounts of BHEBN, BEPF, DPC and sodium bicarbonate were changed as follows: 31.0 g (0.083 moles) for BHEBN, 5.4 g (0.009 moles) for BEPF, 20.0 g (0.093 moles) for DPC and 1.5×10$^4$ g (1.8×10$^{-6}$ moles) for sodium bicarbonate.

Example 12

BEPF (54.3 g, 0.092 moles), DPC (20.2 g, 0.094 moles) and sodium bicarbonate (1.5×10$^{-4}$ g, 1.8×10$^{-6}$ moles) were introduced into a 300 ml four-necked flask equipped with a stirring unit and a distillation unit, and then heated to 180° C. under a nitrogen atmosphere at 760 mmHg. At 10 minutes after initiation of heating, the starting materials were confirmed to be completely dissolved, followed by stirring for 20 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

Comparative Example 1

As a polycarbonate resin consisting of bisphenol A (hereinafter also abbreviated as "BPA"), a resin commercially available under the trade name "Iupilon H-4000" was used (a product of Mitsubishi Engineering-Plastics Corporation, Japan; Mw=33,000, Tg=148° C.).

Comparative Example 2

BHEBN (24.4 g, 0.065 moles), BPEF (16.5 g, 0.028 moles), DPC (20.2 g, 0.094 moles) and sodium bicarbonate (1.6×10$^{-4}$ g, 1.9×10$^{-6}$ moles) were introduced into a 300 ml four-necked flask equipped with a stirring unit and a distillation unit, and then heated to 180° C. under a nitrogen atmosphere at 760 mmHg. At 10 minutes after initiation of heating, the starting materials were confirmed to be completely dissolved, followed by stirring for 20 minutes under the same conditions. Subsequently, the degree of reduced pressure was adjusted to 200 mmHg, while the temperature was also elevated to 200° C. at a rate of 60° C./hr. During this step, distillation of by-product phenol was confirmed to start. Subsequently, the same temperature was kept for 20 minutes to effect the reaction. The temperature was further elevated to 230° C. at a rate of 75° C./hr. At 10 minutes after completion of temperature elevation, the degree of reduced pressure was reduced to 1 mmHg or less over 1 hour while keeping the same temperature. Subsequently, the temperature was elevated to 240° C. at a rate of 60° C./hr, and the reaction was continued for an additional 30 minutes under stirring conditions. After completion of the reaction, the reactor was returned to normal pressure by blowing nitrogen thereinto, and the resulting polycarbonate resin was collected.

(2-2) Production of Optical Films

The polycarbonate resins obtained in Examples 7 to 12 and Comparative Examples 1 and 2 were dissolved in methylene chloride to prepare resin solutions each having a solid content of 5.3% by weight. These resin solutions were each poured into a mold for cast film formation and the methylene chloride was volatilized, followed by peeling and drying to prepare a cast film of 0.1 mm thickness. The thus prepared cast films were evaluated for refractive index (nD), Abbe's number (ν) and total light transmittance. Moreover, the resulting cast films were each stretched 1.5-fold at a temperature of Tg+5° C. and evaluated for orientation birefringence (Δn).

It should be noted that the polycarbonate resin obtained in Comparative Example 2 was brittle due to its low molecular weight and was not able to be formed into a cast film.

The resins obtained in the examples and comparative examples described above were measured for weight average molecular weight (Mw) calculated as polystyrene, glass transition temperature (Tg) and thermal decomposition initiation temperature (Td), and the results obtained are shown in Table 3-4 and Table 3-5. In addition, the criteria used for evaluation of orientation birefringence (Δn) in Table 3-5 are shown in Table 3-6.

TABLE 3-6

| Orientation birefringence Δn (×10⁻³) | Evaluation |
|---|---|
| 0 to 0.1 | Extremely very small |
| Greater than 0.1 to 0.4 | Very small |
| Greater than 0.4 to 1.0 | Small |
| Greater than 1.0 | Large |

The invention claimed is:

1. A polycarbonate resin having a structural unit represented by general formula (A):

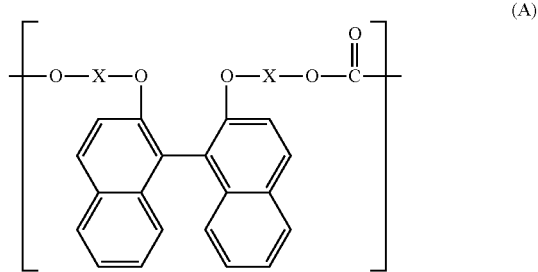

(A)

(in formula (A), X is an alkylene group having 1 to 4 carbon atoms).

2. The polycarbonate resin according to claim 1, consisting only of the structural unit represented by general formula (A).

TABLE 3-4

| | Component ratio | | | Physical properties | | | | | |
|---|---|---|---|---|---|---|---|---|---|
| | BHEBN mol % | BEPF mol % | BPA mol % | Mw — | Tg ° C. | Td ° C. | nD — | ν — | Total light transmittance % |
| Example 7 | 10 | 90 | — | 36000 | 152 | 364 | 1.656 | 21 | 87 |
| Example 8 | 30 | 70 | — | 47000 | 145 | 367 | 1.658 | 21 | 87 |
| Example 9 | 40 | 60 | — | 50000 | 141 | 367 | 1.659 | 21 | 87 |
| Example 10 | 70 | 30 | — | 39000 | 129 | 372 | 1.663 | 20 | 86 |
| Example 11 | 90 | 10 | — | 38000 | 120 | 373 | 1.666 | 19 | 86 |
| Example 12 | — | 100 | — | 64000 | 157 | 377 | 1.655 | 22 | 87 |
| Comparative Example 1 | — | — | 100 | 33000 | 148 | — | 1.586 | 30 | 91 |
| Comparative Example 2 | 70 | 30 | — | 2800 | 54 | 314 | — | — | — |

TABLE 3-5

| | Component ratio | | | Birefringence | |
|---|---|---|---|---|---|
| | | | | Orientation | |
| | BHEBN mol % | BEPF mol % | BPA mol % | birefringence Δn | Sign of birefringence |
| Example 7 | 10 | 90 | — | 0.60 × 10⁻³ | Negative |
| Example 8 | 30 | 70 | — | 0.41 × 10⁻³ | Negative |
| Example 9 | 40 | 60 | — | 0.29 × 10⁻³ | Negative |
| Example 10 | 70 | 30 | — | 0.02 × 10⁻³ | Positive |
| Example 11 | 90 | 10 | — | 0.21 × 10⁻³ | Positive |
| Example 12 | — | 100 | — | 0.80 × 10⁻³ | Negative |
| Comparative Example 1 | — | — | 100 | 9.5 × 10⁻³ | Positive |
| Comparative Example 2 | 70 | 30 | — | — | — |

3. A method for preparing the polycarbonate resin according to claim 1, wherein a compound represented by general formula (I) is used as a starting material:

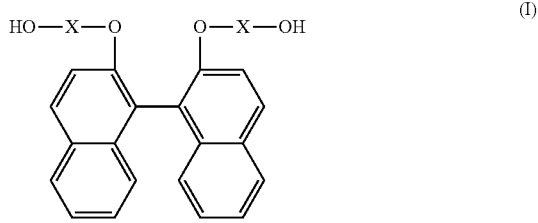

(I)

(in formula (I), X is an alkylene group having 1 to 4 carbon atoms).

4. The method for preparing the polycarbonate resin according to claim 3, comprising:
reacting the compound represented by general formula (I) and a carbonic acid diester, and
distilling off monohydroxy compounds.

5. The method for preparing the polycarbonate resin according to claim 4, wherein the reaction of the compound represented by general formula (I) with the carbonic acid diester is accomplished by melting the compound represented by general formula (I) and the carbonic acid diester, and then reacting them for at least 30 minutes in a state where by-product monohydroxy compounds are kept.

6. The polycarbonate resin according to claim 1, further containing a structural unit represented by general formula (B):

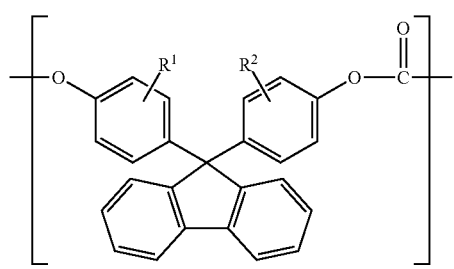

(B)

(in formula (B), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

7. The polycarbonate resin according to claim 6, wherein a molar ratio (A/B) between the structural unit (A) and the structural unit (B) is in the range of 20/80 to 99/1.

8. The polycarbonate resin according to claim 6, wherein the structural unit (A) is a structural unit (A1) represented by the following formula:

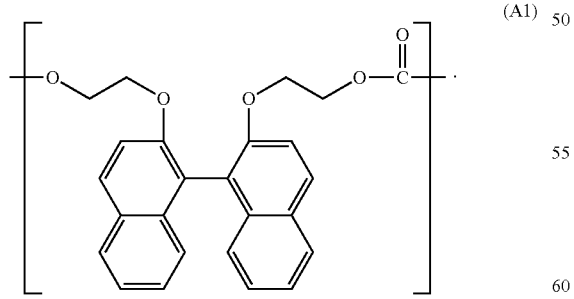

(A1)

9. The polycarbonate resin according to claim 6, wherein the structural unit (B) is a structural unit (B1) represented by the following formula:

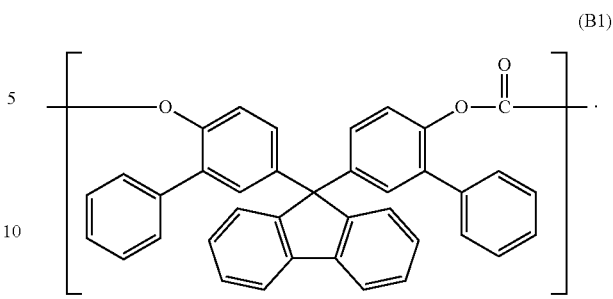

(B1)

10. The polycarbonate resin according to claim 6, wherein the structural unit (B) is a structural unit (B2) represented by the following formula:

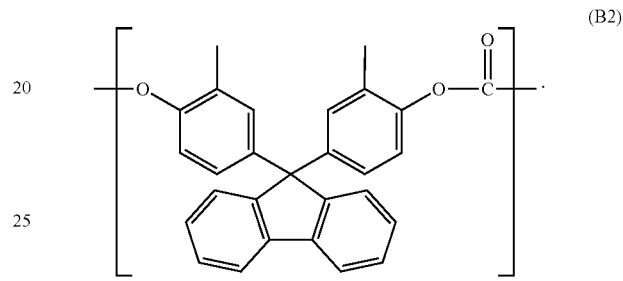

(B2)

11. A method for preparing the polycarbonate resin according to claim 6, wherein a compound represented by general formula (C) is used as a starting material:

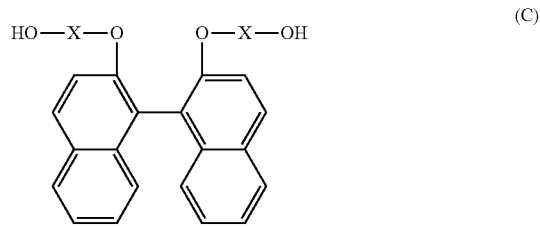

(C)

(in formula (C), X is an alkylene group having 1 to 4 carbon atoms).

12. The method for preparing the polycarbonate resin according to claim 11, comprising:
reacting the compound represented by general formula (C), a compound represented by general formula (D) and a carbonic acid diester, and
distilling off monohydroxy compounds:

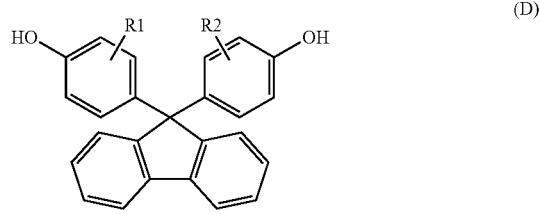

(D)

(in formula (D), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

13. The polycarbonate resin according to claim 1, further containing a structural unit represented by general formula (B'):

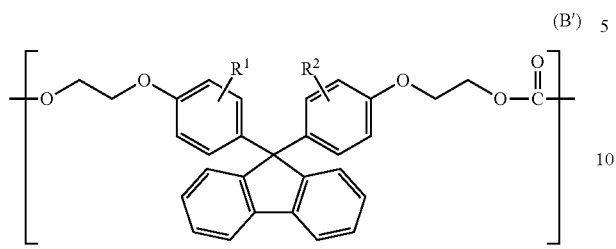
(B')

(in formula (B'), R1 and R2 are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

14. The polycarbonate resin according to claim 13, wherein the structural unit represented by general formula (A) constitutes 1 to 99 mol % of all structural units.

15. A polycarbonate resin, consisting only of the structural unit represented by general formula (B').

16. The polycarbonate resin according to claim 13, wherein the resin has a refractive index nD of 1.640 to 1.680 and Abbe's number ν of 24 or less.

17. The polycarbonate resin according to claim 13, wherein the resin has an orientation birefringence Δn of $1.0 \times 10^{-3}$ or less.

18. The polycarbonate resin according to claim 13, wherein the resin has 5% weight loss temperature of 350° C. or higher measured at a rate of temperature rise of 10° C./min.

19. A method for preparing the polycarbonate resin according to claim 13, wherein a compound represented by general formula (C) is used as a starting material:

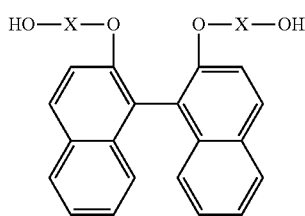
(C)

(in formula (C), X is an alkylene group having 1 to 4 carbon atoms).

20. The method for preparing the polycarbonate resin according to claim 19, comprising:
reacting the compound represented by general formula (C), a compound represented by general formula (D') and a carbonic acid diester, and
distilling off monohydroxy compounds:

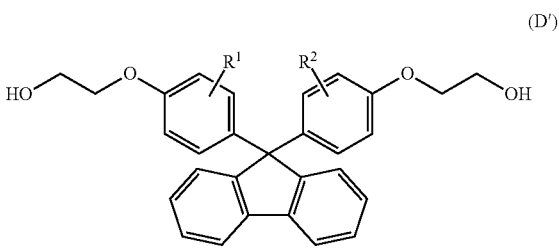
(D')

(in formula (D'), $R^1$ and $R^2$ are each independently a hydrogen atom, an alkyl group having 1 to 20 carbon atoms, an alkoxyl group having 1 to 20 carbon atoms, a cycloalkyl group having 5 to 20 carbon atoms, a cycloalkoxyl group having 5 to 20 carbon atoms, an aryl group having 6 to 20 carbon atoms or an aryloxy group having 6 to 20 carbon atoms).

21. The method for preparing the polycarbonate resin according to claim 20, wherein the reaction of the compound represented by general formula (C), the compound represented by general formula (D') and the carbonic acid diester is accomplished by melting the compound represented by general formula (C), the compound represented by general formula (D') and the carbonic acid diester, and then reacting them for at least 30 minutes in a state where by-product monohydroxy compounds are kept without being distilled off.

22. An optical molded article, comprising the polycarbonate resin according to claim 1.

23. An optical lens, comprising the polycarbonate resin according to claim 1.

24. An optical film, comprising the polycarbonate resin according to claim 1.

* * * * *